United States Patent
Yu et al.

(10) Patent No.: US 10,873,924 B2
(45) Date of Patent: *Dec. 22, 2020

(54) PAGING MESSAGE TRANSMISSION METHOD, BASE STATION, MOBILITY MANAGEMENT ENTITY, AND USER EQUIPMENT

(71) Applicant: Huawei Technologies Co., Ltd., Shenzhen (CN)

(72) Inventors: Zheng Yu, Beijing (CN); Yongqiang Gao, Beijing (CN); Xingqing Cheng, Beijing (CN); Fang Nan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/014,228

(22) Filed: Jun. 21, 2018

(65) Prior Publication Data

US 2018/0302880 A1    Oct. 18, 2018

Related U.S. Application Data

(63) Continuation of application No. 15/588,199, filed on May 5, 2017, which is a continuation of application No. PCT/CN2014/090611, filed on Nov. 7, 2014.

(51) Int. Cl.
    *H04W 68/00*    (2009.01)
    *H04W 68/02*    (2009.01)
    (Continued)

(52) U.S. Cl.
    CPC ......... *H04W 68/02* (2013.01); *H04W 16/26* (2013.01); *H04W 64/006* (2013.01)

(58) Field of Classification Search
    None
    See application file for complete search history.

(56) References Cited

U.S. PATENT DOCUMENTS 8,483,618 B1 *  7/2013  Vargantwar ........... H04W 52/50
                                                  455/67.11
9,667,386 B2 *  5/2017  Li .......................... H04L 1/1858
                        (Continued)

FOREIGN PATENT DOCUMENTS

CN       102316473 A     1/2012
CN       102396257 A     3/2012
                (Continued)

OTHER PUBLICATIONS

3GPP TR 23.882 V8.0.0, "3rd Generation Partnership Project; Technical Specification Group Services and System Aspects; 3GPP System Architecture Evolution: Report on Technical Options and Conclusions (Release 8)", Global System for Mobile Communications, Sep. 2008, total 234 pages.

(Continued)

*Primary Examiner* — Charles T Shedrick
(74) *Attorney, Agent, or Firm* — Slater Matsil, LLP

(57) ABSTRACT

A paging message transmission method, a base station, a mobility management entity, and user equipment are provided. In an embodiment, the method includes receiving, by a terminal device, a paging message from a base station, wherein the paging message is sent according to a number of paging attempts on the terminal device performed by a mobility management entity (MME) which initiated paging to the terminal device.

8 Claims, 8 Drawing Sheets

(51) Int. Cl.
*H04W 16/26* (2009.01)
*H04W 64/00* (2009.01)

(56) References Cited

U.S. PATENT DOCUMENTS

| | | | |
|---|---|---|---|
| 9,668,236 B2* | 5/2017 | Ryu | H04W 68/00 |
| 2010/0172277 A1 | 7/2010 | Kashiwase | |
| 2011/0306363 A1* | 12/2011 | Wang | H04W 24/02 455/456.1 |
| 2014/0073311 A1 | 3/2014 | Xu et al. | |
| 2015/0131579 A1* | 5/2015 | Li | H04L 1/08 370/329 |
| 2015/0173122 A1* | 6/2015 | Schliwa-Bertling | H04W 56/00 370/311 |
| 2015/0327032 A1* | 11/2015 | Hedman | H04W 4/70 370/329 |
| 2015/0365914 A1 | 12/2015 | Yu et al. | |
| 2016/0044578 A1* | 2/2016 | Vajapeyam | H04W 52/0216 370/252 |
| 2016/0066296 A1* | 3/2016 | Su | H04W 68/005 455/458 |
| 2016/0205659 A1* | 7/2016 | Bergman | H04L 1/1812 370/252 |
| 2016/0205661 A1* | 7/2016 | Ryu | H04W 36/30 455/458 |
| 2016/0227580 A1* | 8/2016 | Xiong | H04B 17/318 |
| 2016/0234804 A1* | 8/2016 | Hu | H04W 68/02 |
| 2016/0262129 A1* | 9/2016 | Better | H04W 68/02 |
| 2016/0286385 A1* | 9/2016 | Ryu | H04W 76/28 |
| 2017/0006572 A1* | 1/2017 | Lee | H04W 60/04 |
| 2017/0019878 A1* | 1/2017 | Hu | H04W 68/02 |
| 2017/0064670 A1* | 3/2017 | Shen | H04W 68/005 |
| 2017/0127381 A1* | 5/2017 | Yavus | H04W 4/70 |
| 2018/0176847 A1* | 6/2018 | Fasil Abdul | H04W 72/085 |
| 2018/0352423 A1* | 12/2018 | Breuer | H04W 48/20 |

FOREIGN PATENT DOCUMENTS

| | | |
|---|---|---|
| CN | 102655658 A | 9/2012 |
| CN | 104137635 A | 11/2014 |
| CN | 104139635 A | 11/2014 |
| EP | 2953409 A1 | 12/2015 |
| KR | 20140076784 A | 6/2014 |
| WO | 2008146717 A1 | 12/2008 |
| WO | 2013021436 A1 | 2/2013 |
| WO | 2014008777 A1 | 1/2014 |
| WO | 2014019235 A1 | 2/2014 |
| WO | 2014131167 A1 | 9/2014 |
| WO | 2015199422 * | 12/2015 |

OTHER PUBLICATIONS

3GPP TS 36.300 V123.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), Sep. 2014, 215 pages.

3GPP TS 36.331, V12.3.0, "3rd Generation Partnership Project; Technical Specification Group Radio Access Network; Evolved Universal Terrestrial Radio Access (E-UTRA); Radio Resource Control (RRC); Protocol Specification (Release 12)", Sep. 2014, 378 pages.

3GPP TS 36.413, V12.3.0, "3rd Generation Partnership Project; Technical Specification Group Radio Access Network; Evolved Universal Terrestrial Radio Access Network (E-UTRAN); S1 Application Protocol (S1AP) (Release 12)"; Sep. 2014, 290 pages.

Vodafone Group, "Acquisition of network originated data by MTC UEs in enhanced coverage mode", 3GPP TSG RAN WG2 #85, R2-140629, Prague, Czech Republic, Feb. 10-14, 2014, total 4 pages.

Alcatel-Lucent et al., "Coverage enhancement requirements for MTC UE", 3GPP TSG-RAN WG1 Meeting #75, R1-135152, San Francisco, USA, Nov. 11-15, 2013, total 4 pages.

Ericsson, "Common control messages for MTC", 3GPP TSG-RAN WG1 Meeting #78bis, R1-143789, Ljubljana, Slovenia, Oct. 6-10, 2014, total 6 pages.

\* cited by examiner

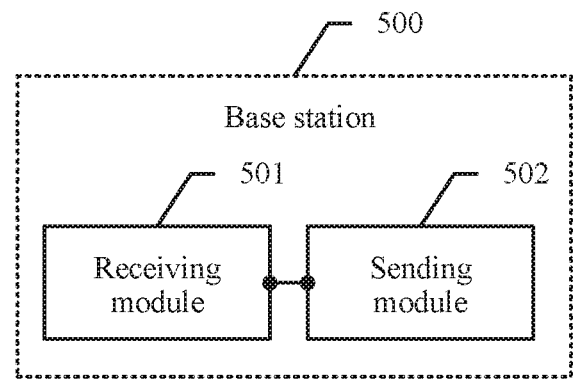
FIG. 5-a
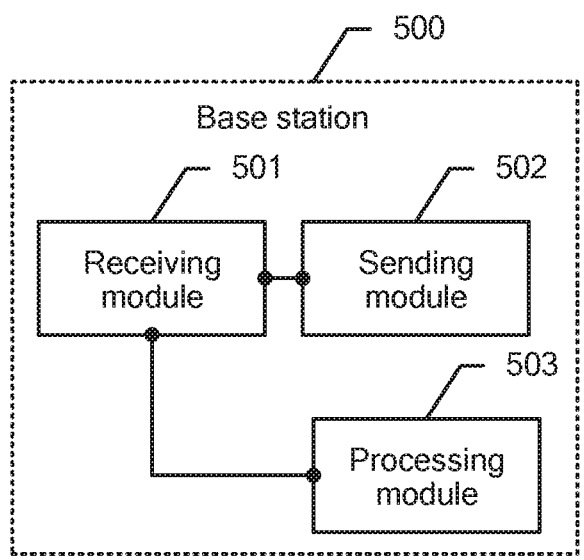
FIG. 5-b
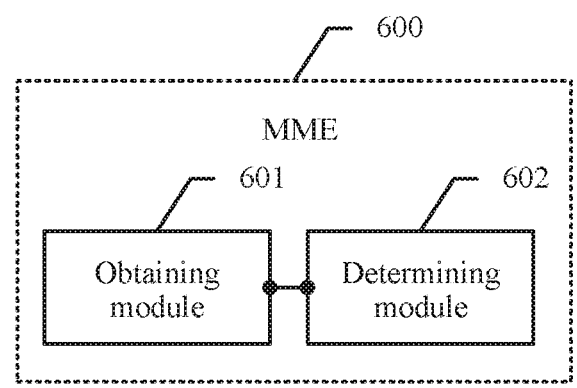
FIG. 6-a

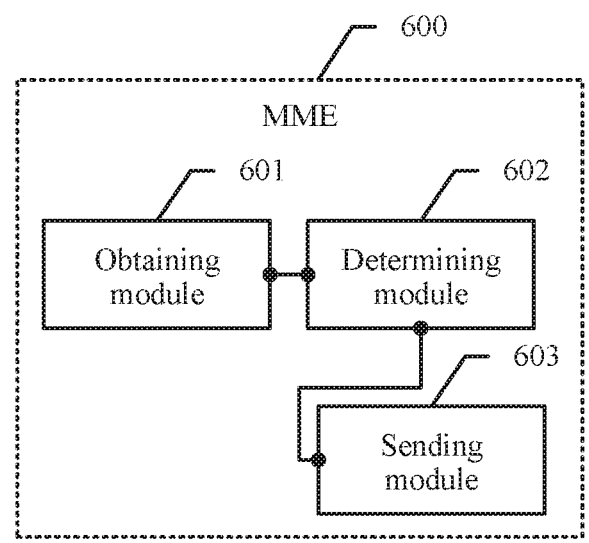
FIG. 6-b
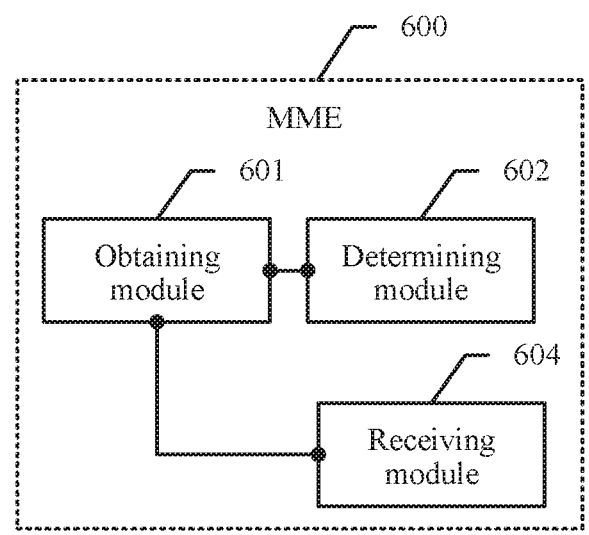
FIG. 6-c

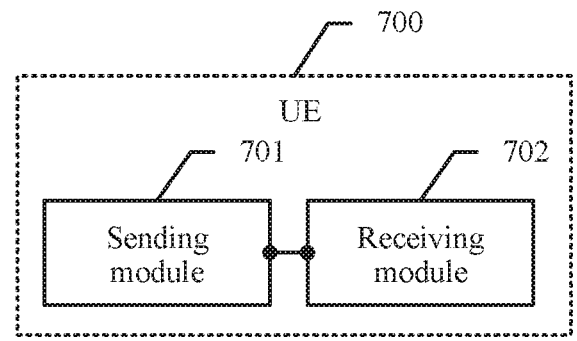
FIG. 7-a
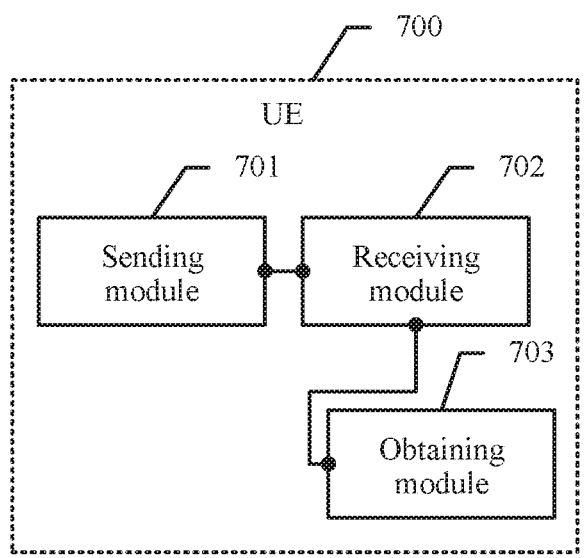
FIG. 7-b

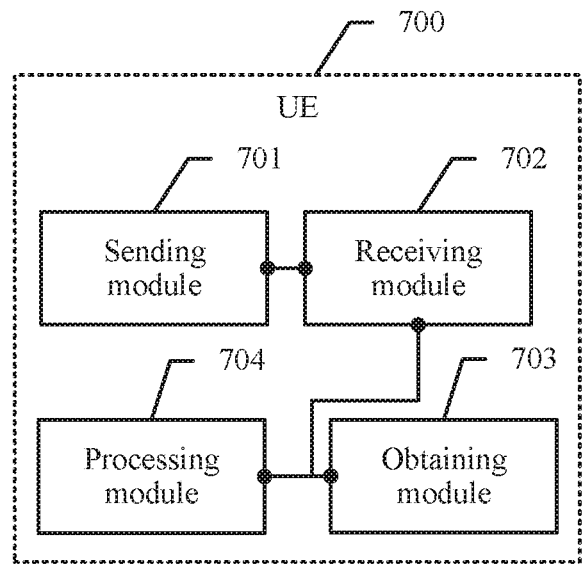
FIG. 7-c
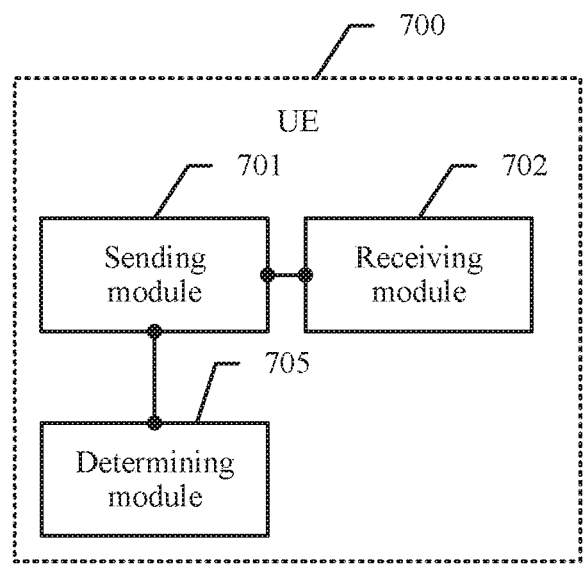
FIG. 7-d

PAGING MESSAGE TRANSMISSION METHOD, BASE STATION, MOBILITY MANAGEMENT ENTITY, AND USER EQUIPMENT

CROSS-REFERENCE TO RELATED APPLICATIONS

This application is a continuation of U.S. patent application Ser. No. 15/588,199, filed on May 5, 2017, which is a continuation of International Application No. PCT/CN2014/090611, filed on Nov. 7, 2014. All of the afore-mentioned patent applications are hereby incorporated by reference in their entireties.

TECHNICAL FIELD

Embodiments of the present application relate to the communications field, and in particular, to a paging message transmission method, a base station, a mobility management entity, and user equipment.

BACKGROUND

The Internet of Things refers to a network in which information about a physical world is obtained by deploying various devices capable of awareness, computation, execution, and communication, and information transmission, coordination, and processing are implemented by using a network, so that human beings and/or things are interconnected.

Smart meter reading is an important application in the Internet of Things. For example, the smart meter reading may be specifically used to automatically read metering information of water, electricity, gas, and the like, and report the metering information to a data center. This type of service is usually small packet transmission performed at an extremely low data rate, and may be completed in a silent period during which less other services exist. User equipment comprising a smart meter reading is usually mounted in a residential basement, is isolated by a metal housing, or is placed in an old building with thick walls. In this case, a communication path between a user equipment and a base station suffers a heavy loss. A problem of how to ensure coverage for the user equipment during paging may occur when the old location of the user equipment (e.g., basement) cannot be changed and a relay unit cannot be added (because of cost reasons).

SUMMARY

Embodiments of the present application provide a paging message transmission method, a base station, a mobility management entity, and an user equipment, so as to effectively cover the user equipment.

According to a first aspect, an embodiment of the present application provides a paging message transmission method. The method includes receiving, by a base station, a first paging message sent by a mobility management entity (MME), where the first paging message includes coverage enhancement information of user equipment (UE) to be paged by using the first paging message. The method further includes sending, by the base station, a second paging message to the UE according to the coverage enhancement information of the UE.

With reference to the first aspect, in a first possible implementation manner of the first aspect, the coverage enhancement information of the UE indicates that the UE requires coverage enhancement; and the sending, by the base station, a second paging message to the UE according to the coverage enhancement information of the UE includes: when the base station determines that the base station supports coverage enhancement, sending, by the base station, the second paging message to the UE in a coverage enhancement manner supported by the base station; or when the base station determines that the base station does not support coverage enhancement, sending, by the base station, the second paging message to the UE in a non-coverage enhancement manner.

With reference to the first possible implementation manner of the first aspect, in a second possible implementation manner of the first aspect, the sending, by the base station, the second paging message to the UE in a coverage enhancement manner supported by the base station includes sending, by the base station, the second paging message to the UE according to a highest coverage enhancement level or a lowest coverage enhancement level, where the highest coverage enhancement level or the lowest coverage enhancement level is supported by the base station.

With reference to the first aspect, in a third possible implementation manner of the first aspect, the coverage enhancement information of the UE indicates a coverage enhancement level about the UE; and the sending, by the base station, a second paging message to the UE according to the coverage enhancement information of the UE includes: when a highest coverage enhancement level supported by the base station is higher than or equal to the coverage enhancement level about the UE, sending, by the base station, the second paging message to the UE according to the coverage enhancement level about the UE; or when a highest coverage enhancement level supported by the base station is lower than the coverage enhancement level about the UE, sending, by the base station, the second paging message to the UE according to the highest coverage enhancement level supported by the base station; or when the base station determines that the base station does not support coverage enhancement, sending, by the base station, the second paging message to the UE in a non-coverage enhancement manner.

With reference to the first aspect, in a fourth possible implementation manner of the first aspect, the coverage enhancement information of the UE indicates a coverage enhancement level about the UE, and after the receiving, by a base station, a first paging message sent by a mobility management entity MME, the method further includes: when a difference between a highest coverage enhancement level supported by the base station and the coverage enhancement level about the UE does not meet a preset first condition, skipping, by the base station, sending the second paging message to the UE; or the sending, by the base station, a second paging message to the UE according to the coverage enhancement information of the UE is specifically: when a difference between a highest coverage enhancement level supported by the base station and the coverage enhancement level about the UE meets a preset first condition, sending, by the base station, the second paging message to the UE according to the coverage enhancement information of the UE.

With reference to the first aspect, in a fifth possible implementation manner of the first aspect, before the sending, by the base station, a second paging message to the UE according to the coverage enhancement information of the UE, the method further includes: receiving, by the base station, the coverage enhancement information of the UE that is reported by the UE; or receiving, by the base station, the coverage enhancement information of the UE, and reporting, by the base station, the coverage enhancement information of the UE to the MME.

With reference to the first aspect, in a sixth possible implementation manner of the first aspect, the method further includes: sending, by the base station, coverage enhancement information of the base station to the MME.

With reference to the first aspect, or the first, the second, the third, the fourth, the fifth, or the sixth possible implementation manner of the first aspect, in a seventh possible implementation manner of the first aspect, the coverage enhancement information of the UE includes at least one or more types of the following content: the UE requires coverage enhancement, the UE does not require coverage enhancement, the coverage enhancement level about the UE, a repetition level about the UE, a repetition count about the UE, a quantity of retransmissions about the UE, a spreading factor about the UE, a narrowband bandwidth about the UE, a time interval bundle size about the UE, a number of continuous attempts about the UE, or a power spectrum density boosting multiple about the UE.

With reference to the sixth possible implementation manner of the first aspect, in an eighth possible implementation manner of the first aspect, the coverage enhancement information of the base station includes at least one or more types of the following content: the base station supports coverage enhancement, the base station does not support coverage enhancement, a coverage enhancement level supported by the base station, the highest coverage enhancement level supported by the base station, a quantity of coverage enhancement levels supported by the base station, an index of a coverage enhancement level supported by the base station, a repetition level supported by the base station, a highest repetition level supported by the base station, a repetition count supported by the base station, a maximum repetition count supported by the base station, a quantity of retransmissions that is supported by the base station, a maximum quantity of retransmissions that is supported by the base station, a maximum spreading factor supported by the base station, a minimum narrowband supported by the base station, a maximum time interval bundle supported by the base station, or a maximum power spectrum density boosting multiple supported by the base station.

According to a second aspect, an embodiment of the present application provides a paging message transmission method. The method includes obtaining, by a mobility management entity MME, coverage enhancement information of user equipment UE. The method further includes determining, by the MME according to the coverage enhancement information of the UE, whether to send a first paging message to a base station, where the base station is located in a tracking area in which the UE is located.

With reference to the second aspect, in a first possible implementation manner of the second aspect, the determining, by the MME according to the coverage enhancement information of the UE, whether to send a first paging message to a base station includes: when the coverage enhancement information of the UE indicates that the UE requires coverage enhancement, determining, by the MME, to send a first paging message to the base station, where the first paging message includes the coverage enhancement information of the UE; and after the determining, by the MME, to send a first paging message to the base station, the method further includes: sending, by the MME, a first paging message to the base station, where the first paging message includes the coverage enhancement information of the UE.

With reference to the second aspect, in a second possible implementation manner of the second aspect, the method further includes: receiving, by the MME, coverage enhancement information of the base station that is sent by the base station.

With reference to the second possible implementation manner of the second aspect, in a third possible implementation manner of the second aspect, the determining, by the MME according to the coverage enhancement information of the UE, whether to send a first paging message to a base station includes: when the coverage enhancement information of the UE indicates that the UE requires coverage enhancement and the coverage enhancement information of the base station indicates that the base station supports coverage enhancement, determining, by the MME, to send a first paging message to the base station, where the first paging message includes the coverage enhancement information of the UE; and after the determining, by the MME, to send a first paging message to the base station, the method further includes: sending, by the MME, a first paging message to the base station, where the first paging message includes the coverage enhancement information of the UE.

With reference to the second possible implementation manner of the second aspect, in a fourth possible implementation manner of the second aspect, the determining, by the MME according to the coverage enhancement information of the UE, whether to send a first paging message to a base station includes: when the coverage enhancement information of the UE indicates that the UE requires coverage enhancement and the coverage enhancement information of the base station indicates that the base station does not support coverage enhancement, determining, by the MME, not to send a first paging message to the base station.

With reference to the second possible implementation manner of the second aspect, in a fifth possible implementation manner of the second aspect, the determining, by the MME according to the coverage enhancement information of the UE, whether to send a first paging message to a base station includes: when the coverage enhancement information of the UE indicates that the UE requires coverage enhancement and the coverage enhancement information of the base station indicates that the base station does not support coverage enhancement, determining, by the MME, to send a first paging message to the base station, where the first paging message does not include the coverage enhancement information of the UE.

With reference to the second possible implementation manner of the second aspect, in a sixth possible implementation manner of the second aspect, the determining, by the MME according to the coverage enhancement information of the UE, whether to send a first paging message to a base station includes: when a difference between a highest coverage enhancement level supported by the base station and a coverage enhancement level about the UE meets a preset first condition, determining, by the MME, to send a first paging message to the base station, where the first paging message includes the coverage enhancement information of the UE; and after the determining, by the MME, to send a first paging message to the base station, the method further includes: sending, by the MME, a first paging message to the base station.

With reference to the second possible implementation manner of the second aspect, in a seventh possible implementation manner of the second aspect, the determining, by the MME according to the coverage enhancement information of the UE, whether to send a first paging message to a base station includes: when a difference between a highest coverage enhancement level supported by the base station and a coverage enhancement level about the UE does not meet a preset first condition, determining, by the MME, not to send a first paging message to the base station.

With reference to the second aspect, or the first, the second, the third, the fourth, the fifth, the sixth, or the seventh possible implementation manner of the second aspect, in an eighth possible implementation manner of the second aspect, the coverage enhancement information of the UE includes at least one or more types of the following content: the UE requires coverage enhancement, the UE does not require coverage enhancement, the coverage enhancement level about the UE, a repetition level about the UE, a repetition count about the UE, a quantity of retransmissions about the UE, a spreading factor about the UE, a narrowband bandwidth about the UE, a time interval bundle size about the UE, a number of continuous attempts about the UE, or a power spectrum density boosting multiple about the UE.

With reference to the second, the third, the fourth, the fifth, the sixth, or the seventh possible implementation manner of the second aspect, in a ninth possible implementation manner of the second aspect, the coverage enhancement information of the base station includes at least one or more types of the following content: the base station supports coverage enhancement, the base station does not support coverage enhancement, a coverage enhancement level supported by the base station, the highest coverage enhancement level supported by the base station, a quantity of coverage enhancement levels supported by the base station, an index of a coverage enhancement level supported by the base station, a repetition level supported by the base station, a highest repetition level supported by the base station, a repetition count supported by the base station, a maximum repetition count supported by the base station, a quantity of retransmissions that is supported by the base station, a maximum quantity of retransmissions that is supported by the base station, a maximum spreading factor supported by the base station, a minimum narrowband supported by the base station, a maximum time interval bundle supported by the base station, or a maximum power spectrum density boosting multiple supported by the base station.

According to a third aspect, an embodiment of the present application provides a paging message transmission method. The method includes reporting, by user equipment UE, coverage enhancement information of the UE to a base station or a mobility management entity MME. The method further includes receiving, by the UE, a paging message sent by the base station to the UE according to the coverage enhancement information of the UE.

With reference to the third aspect, in a first possible implementation manner of the third aspect, the method further includes: obtaining, by the UE, coverage enhancement information of the base station from a broadcast message of the base station; and the receiving, by the UE, a paging message sent by the base station to the UE according to the coverage enhancement information of the UE includes: when a highest coverage enhancement level supported by the base station is higher than or equal to a coverage enhancement level about the UE, receiving, by the UE according to the coverage enhancement level about the UE, the paging message sent by the base station; or when a highest coverage enhancement level supported by the base station is lower than a coverage enhancement level about the UE, receiving, by the UE according to the highest coverage enhancement level supported by the base station, the paging message sent by the base station; or when the base station does not support coverage enhancement, receiving, by the UE in a non-coverage enhancement manner, the paging message sent by the base station.

With reference to the third aspect, in a second possible implementation manner of the third aspect, the method further includes: obtaining, by the UE, coverage enhancement information of the base station from a broadcast message of the base station; and when a difference between a highest coverage enhancement level supported by the base station and a coverage enhancement level about the UE does not meet a preset first condition, skipping, by the UE, receiving the paging message sent by the base station; or the receiving, by the UE, a paging message sent by the base station to the UE according to the coverage enhancement information of the UE is specifically: when a difference between a highest coverage enhancement level supported by the base station and a coverage enhancement level about the UE meets a preset first condition, receiving, by the UE, the paging message sent by the base station.

With reference to the third aspect, in a third possible implementation manner of the third aspect, the reporting, by UE, coverage enhancement information of the UE to the base station or a mobility management entity MME, the method further includes: determining, by the UE, whether the UE requires coverage enhancement; and if the UE does not require coverage enhancement, adding, by the UE to the coverage enhancement information of the UE, information that the UE does not require coverage enhancement; or if the UE requires coverage enhancement, adding, by the UE to the coverage enhancement information of the UE, information that the UE requires coverage enhancement.

With reference to the third possible implementation manner of the third aspect, in a fourth possible implementation manner of the third aspect, the determining, by the UE, whether the UE requires coverage enhancement includes: determining, by the UE, whether reference signal received power (RSRP) of the UE is greater than a first threshold; and if the RSRP is greater than or equal to the first threshold, determining that the UE does not require coverage enhancement; or if the RSRP is less than the first threshold, determining that the UE requires coverage enhancement; or determining, by the UE, whether a path loss of the UE is less than a second threshold; and if the path loss is less than the second threshold, determining that the UE does not require coverage enhancement; or if the path loss is greater than or equal to the second threshold, determining that the UE requires coverage enhancement; or determining, by the UE, whether detection performed by the UE on the physical random access channel meets a preset second condition; and if the detection on the physical random access channel meets the preset second condition, determining that the UE does not require coverage enhancement; or if the detection on the physical random access channel does not meet the preset second condition, determining that the UE requires coverage enhancement; or determining, by the UE, whether a random access process completed by the UE meets a preset third condition; and if the random access process completed by the UE meets the preset third condition, determining that the UE does not require coverage enhancement; or if the random access process completed by the UE does not meet the preset third condition, determining that the UE requires coverage enhancement.

With reference to the third aspect, or the first, the second, the third, or the fourth possible implementation manner of the third aspect, in a fifth possible implementation manner of the third aspect, the coverage enhancement information of the UE includes at least one or more types of the following content: the UE requires coverage enhancement, the UE does not require coverage enhancement, the coverage enhancement level about the UE, a repetition level about the UE, a repetition count about the UE, a quantity of retransmissions about the UE, a spreading factor about the UE, a narrowband bandwidth about the UE, a time interval bundle size about the UE, a number of continuous attempts about the UE, or a power spectrum density boosting multiple about the UE.

According to a fourth aspect, an embodiment of the present application provides a base station. The base station includes a receiving module configured to receive a first paging message sent by a mobility management entity MME. The first paging message includes coverage enhancement information of user equipment UE to be paged by using the first paging message. The base station further includes a sending module configured to send a second paging message to the UE according to the coverage enhancement information of the UE.

With reference to the fourth aspect, in a first possible implementation manner of the fourth aspect, the coverage enhancement information of the UE indicates that the UE requires coverage enhancement, and the sending module is specifically configured to: when the base station determines that the base station supports coverage enhancement, send the second paging message to the UE in a coverage enhancement manner supported by the base station; or when the base station determines that the base station does not support coverage enhancement, send the second paging message to the UE in a non-coverage enhancement manner.

With reference to the first possible implementation manner of the fourth aspect, in a second possible implementation manner of the fourth aspect, the sending module is specifically configured to send the second paging message to the UE according to a highest coverage enhancement level or a lowest coverage enhancement level, where the highest coverage enhancement level or the lowest coverage enhancement level is supported by the base station.

With reference to the fourth aspect, in a third possible implementation manner of the fourth aspect, the coverage enhancement information of the UE indicates a coverage enhancement level about the UE, and the sending module is specifically configured to: when a highest coverage enhancement level supported by the base station is higher than or equal to the coverage enhancement level about the UE, send the second paging message to the UE according to the coverage enhancement level about the UE; or when a highest coverage enhancement level supported by the base station is lower than the coverage enhancement level about the UE, send the second paging message to the UE according to the highest coverage enhancement level supported by the base station; or when the base station determines that the base station does not support coverage enhancement, send the second paging message to the UE in a non-coverage enhancement manner.

With reference to the fourth aspect, in a fourth possible implementation manner of the fourth aspect, the coverage enhancement information of the UE indicates a coverage enhancement level about the UE, and the base station further includes: a processing module, configured to: when a difference between a highest coverage enhancement level supported by the base station and the coverage enhancement level about the UE does not meet a preset first condition, skip sending the second paging message to the UE; or the sending module is specifically configured to: when a difference between a highest coverage enhancement level supported by the base station and the coverage enhancement level about the UE meets a preset first condition, send the second paging message to the UE according to the coverage enhancement information of the UE.

With reference to the fourth aspect, in a fifth possible implementation manner of the fourth aspect, the receiving module is further configured to receive the coverage enhancement information of the UE that is reported by the UE; or the receiving module is further configured to receive the coverage enhancement information of the UE, and the sending module is further configured to report the coverage enhancement information of the UE to the MME.

With reference to the fourth aspect, in a sixth possible implementation manner of the fourth aspect, the sending module is further configured to send coverage enhancement information of the base station to the MME.

With reference to the fourth aspect, or the first, the second, the third, the fourth, the fifth, or the sixth possible implementation manner of the fourth aspect, in a seventh possible implementation manner of the fourth aspect, the coverage enhancement information of the UE includes at least one or more types of the following content: the UE requires coverage enhancement, the UE does not require coverage enhancement, the coverage enhancement level about the UE, a repetition level about the UE, a repetition count about the UE, a quantity of retransmissions about the UE, a spreading factor about the UE, a narrowband bandwidth about the UE, a time interval bundle size about the UE, a number of continuous attempts about the UE, or a power spectrum density boosting multiple about the UE.

With reference to the sixth possible implementation manner of the fourth aspect, in an eighth possible implementation manner of the fourth aspect, the coverage enhancement information of the base station includes at least one or more types of the following content: the base station supports coverage enhancement, the base station does not support coverage enhancement, a coverage enhancement level supported by the base station, the highest coverage enhancement level supported by the base station, a quantity of coverage enhancement levels supported by the base station, an index of a coverage enhancement level supported by the base station, a repetition level supported by the base station, a highest repetition level supported by the base station, a repetition count supported by the base station, a maximum repetition count supported by the base station, a quantity of retransmissions that is supported by the base station, a maximum quantity of retransmissions that is supported by the base station, a maximum spreading factor supported by the base station, a minimum narrowband supported by the base station, a maximum time interval bundle supported by the base station, or a maximum power spectrum density boosting multiple supported by the base station.

According to a fifth aspect, an embodiment of the present application provides a mobility management entity (MME). The MME includes an obtaining module configured to obtain coverage enhancement information of user equipment UE. The MME further includes a determining module configured to determine, according to the coverage enhancement information of the UE, whether to send a first paging message to a base station, where the base station is located in a tracking area in which the UE is located.

With reference to the fifth aspect, in a first possible implementation manner of the fifth aspect, the determining module is specifically configured to: when the coverage enhancement information of the UE indicates that the UE requires coverage enhancement, determine to send a first paging message to the base station, where the first paging message includes the coverage enhancement information of the UE; and the MME further includes: a sending module, configured to: after the determining module determines to send a first paging message to the base station, send a first paging message to the base station, where the first paging message includes the coverage enhancement information of the UE.

With reference to the fifth aspect, in a second possible implementation manner of the fifth aspect, the MME further includes: a receiving module, configured to receive coverage enhancement information of the base station that is sent by the base station.

With reference to the second possible implementation manner of the fifth aspect, in a third possible implementation manner of the fifth aspect, the determining module is specifically configured to: when the coverage enhancement information of the UE indicates that the UE requires coverage enhancement and the coverage enhancement information of the base station indicates that the base station supports coverage enhancement, determine to send a first paging message to the base station, where the first paging message includes the coverage enhancement information of the UE; and the MME further includes: a sending module, configured to: after the determining module determines to send a first paging message to the base station, send a first paging message to the base station, where the first paging message includes the coverage enhancement information of the UE.

With reference to the second possible implementation manner of the fifth aspect, in a fourth possible implementation manner of the fifth aspect, the determining module is specifically configured to: when the coverage enhancement information of the UE indicates that the UE requires coverage enhancement and the coverage enhancement information of the base station indicates that the base station does not support coverage enhancement, determine not to send a first paging message to the base station.

With reference to the second possible implementation manner of the fifth aspect, in a fifth possible implementation manner of the fifth aspect, the determining module is specifically configured to: when the coverage enhancement information of the UE indicates that the UE requires coverage enhancement and the coverage enhancement information of the base station indicates that the base station does not support coverage enhancement, determine to send a first paging message to the base station, where the first paging message does not include the coverage enhancement information of the UE.

With reference to the second possible implementation manner of the fifth aspect, in a sixth possible implementation manner of the fifth aspect, the determining module is specifically configured to: when a difference between a highest coverage enhancement level supported by the base station and a coverage enhancement level about the UE meets a preset first condition, determine to send a first paging message to the base station, where the first paging message includes the coverage enhancement information of the UE; and the MME further includes: a sending module, configured to send a first paging message to the base station.

With reference to the second possible implementation manner of the fifth aspect, in a seventh possible implementation manner of the fifth aspect, the determining module is specifically configured to: when a difference between a highest coverage enhancement level supported by the base station and a coverage enhancement level about the UE does not meet a preset first condition, determine not to send a first paging message to the base station.

With reference to the fifth aspect, or the first, the second, the third, the fourth, the fifth, the sixth, or the seventh possible implementation manner of the fifth aspect, in an eighth possible implementation manner of the fifth aspect, the coverage enhancement information of the UE includes at least one or more types of the following content: the UE requires coverage enhancement, the UE does not require coverage enhancement, the coverage enhancement level about the UE, a repetition level about the UE, a repetition count about the UE, a quantity of retransmissions about the UE, a spreading factor about the UE, a narrowband bandwidth about the UE, a time interval bundle size about the UE, a number of continuous attempts about the UE, or a power spectrum density boosting multiple about the UE.

With reference to the second, the third, the fourth, the fifth, the sixth, or the seventh possible implementation manner of the fifth aspect, in a ninth possible implementation manner of the fifth aspect, the coverage enhancement information of the base station includes at least one or more types of the following content: the base station supports coverage enhancement, the base station does not support coverage enhancement, a coverage enhancement level supported by the base station, the highest coverage enhancement level supported by the base station, a quantity of coverage enhancement levels supported by the base station, an index of a coverage enhancement level supported by the base station, a repetition level supported by the base station, a highest repetition level supported by the base station, a repetition count supported by the base station, a maximum repetition count supported by the base station, a quantity of retransmissions that is supported by the base station, a maximum quantity of retransmissions that is supported by the base station, a maximum spreading factor supported by the base station, a minimum narrowband supported by the base station, a maximum time interval bundle supported by the base station, or a maximum power spectrum density boosting multiple supported by the base station.

According to a sixth aspect, an embodiment of the present application provides user equipment (UE). The UE includes a sending module configured to report coverage enhancement information of the UE to a base station or a mobility management entity (MME). The UE further includes a receiving module configured to receive a paging message sent by the base station to the UE according to the coverage enhancement information of the UE.

With reference to the sixth aspect, in a first possible implementation manner of the sixth aspect, the UE further includes: an obtaining module, configured to obtain coverage enhancement information of the base station from a broadcast message of the base station; and the receiving module is specifically configured to: when a highest coverage enhancement level supported by the base station is higher than or equal to a coverage enhancement level about the UE, receive, according to the coverage enhancement level about the UE, the paging message sent by the base station; or when a highest coverage enhancement level supported by the base station is lower than a coverage enhancement level about the UE, receive, according to the highest coverage enhancement level supported by the base station, the paging message sent by the base station; or when the base station does not support coverage enhancement, receive, in a non-coverage enhancement manner, the paging message sent by the base station.

With reference to the sixth aspect, in a second possible implementation manner of the sixth aspect, the UE further includes: an obtaining module, configured to obtain coverage enhancement information of the base station from a broadcast message of the base station; and a processing module, configured to: when a difference between a highest coverage enhancement level supported by the base station and a coverage enhancement level about the UE does not meet a preset first condition, skip receiving the paging message sent by the base station; or the receiving module is specifically configured to: when a difference between a highest coverage enhancement level supported by the base station and a coverage enhancement level about the UE meets a preset first condition, receive the paging message sent by the base station.

With reference to the sixth aspect, in a third possible implementation manner of the sixth aspect, the UE further includes: a determining module, configured to: determine whether the UE requires coverage enhancement; and if the UE does not require coverage enhancement, add, to the coverage enhancement information of the UE, information that the UE does not require coverage enhancement; or if the UE requires coverage enhancement, add, to the coverage enhancement information of the UE, information that the UE requires coverage enhancement.

With reference to the third possible implementation manner of the sixth aspect, in a fourth possible implementation manner of the sixth aspect, the determining module is specifically configured to: determine whether reference signal received power RSRP of the UE is greater than a first threshold; and if the RSRP is greater than or equal to the first threshold, determine that the UE does not require coverage enhancement; or if the RSRP is less than the first threshold, determine that the UE requires coverage enhancement; or determine whether a path loss of the UE is less than a second threshold; and if the path loss is less than the second threshold, determine that the UE does not require coverage enhancement; or if the path loss is greater than or equal to the second threshold, determine that the UE requires coverage enhancement; or determine whether detection performed by the UE on the physical random access channel meets a preset second condition; and if the detection on the physical random access channel meets the preset second condition, determine that the UE does not require coverage enhancement; or if the detection on the physical random access channel does not meet the preset second condition, determine that the UE requires coverage enhancement; or determine whether a random access process completed by the UE meets a preset third condition; and if the random access process completed by the UE meets the preset third condition, determine that the UE does not require coverage enhancement, or if the random access process completed by the UE does not meet the preset third condition, determine that the UE requires coverage enhancement.

With reference to the sixth aspect, or the first, the second, the third, or the fourth possible implementation manner of the sixth aspect, in a fifth possible implementation manner of the sixth aspect, the coverage enhancement information of the UE includes at least one or more types of the following content: the UE requires coverage enhancement, the UE does not require coverage enhancement, the coverage enhancement level about the UE, a repetition level about the UE, a repetition count about the UE, a quantity of retransmissions about the UE, a spreading factor about the UE, a narrowband bandwidth about the UE, a time interval bundle size about the UE, a number of continuous attempts about the UE, or a power spectrum density boosting multiple about the UE.

It can be learned from the foregoing technical solutions that the embodiments of the present application have the following advantages.

In the embodiments of the present application, an MME sends a first paging message to a base station, and the first paging message includes coverage enhancement information of UE to be paged by using the first paging message. The base station may obtain the coverage enhancement information of the UE from the first paging message sent by the MME, and the base station may send a second paging message to the UE according to the foregoing coverage enhancement information of the UE. Because the base station sends the second paging message to the UE according to the coverage enhancement information of the UE, it is ensured that the UE can normally receive the second paging message sent by the base station, and the UE can be effectively covered.

BRIEF DESCRIPTION OF THE DRAWINGS

FIG. 5-*a* is a schematic structural composition diagram of a base station according to an embodiment of the present application;

FIG. 5-*b* is a schematic structural composition diagram of another base station according to an embodiment of the present application;

FIG. 6-*a* is a schematic structural composition diagram of an MME according to an embodiment of the present application;

FIG. 6-*b* is a schematic structural composition diagram of another MME according to an embodiment of the present application;

FIG. 6-*c* is a schematic structural composition diagram of another MME according to an embodiment of the present application;

FIG. 7-*a* is a schematic structural composition diagram of UE according to an embodiment of the present application;

FIG. 7-*b* is a schematic structural composition diagram of another UE according to an embodiment of the present application;

FIG. 7-*c* is a schematic structural composition diagram of another UE according to an embodiment of the present application;

FIG. 7-*d* is a schematic structural composition diagram of another UE according to an embodiment of the present application;

DETAILED DESCRIPTION OF ILLUSTRATIVE EMBODIMENTS

Embodiments of the present application provide a paging message transmission method, a base station, a mobility management entity, and user equipment, so as to effectively cover the user equipment.

To make the application objectives, features, and advantages of the present application clearer and more comprehensible, the following clearly describes the technical solutions in the embodiments of the present application with reference to the accompanying drawings. Apparently, the embodiments described in the following are merely some rather than all of the embodiments of the present application. All other embodiments obtained by persons skilled in the art based on the embodiments of the present application shall fall within the protection scope of the present application.

In the specification, claims, and accompanying drawings of the present application, the terms "first", "second", and the like are intended to distinguish between similar objects but do not necessarily indicate a specific order or sequence. It should be understood that the terms used in such a way are interchangeable in proper circumstances. This is merely a distinction manner that is used when objects having a same attribute are described in the embodiments of the present application. In addition, the terms "include", "have", and any other variants mean to cover a non-exclusive inclusion, so that a process, a method, a system, a product, or a device that includes a series of units is not necessarily limited to those units, but may include other units that are not expressly listed or are inherent to such a process, method, system, product, or device.

Figure 1:
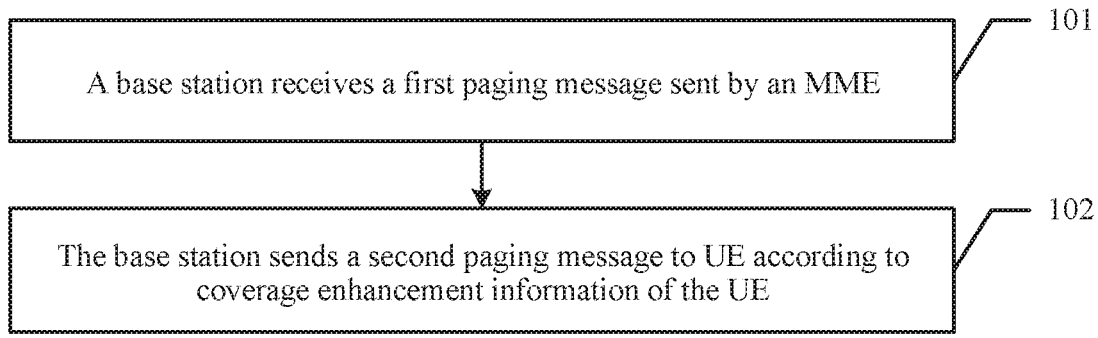
FIG. 1 is a schematic block flowchart of a paging message transmission method according to an embodiment of the present application.

An embodiment of a paging message transmission method in the present application can be applied to a base station. Referring to FIG. 1, a paging message transmission method provided in an embodiment of the present application may include the following steps.

At step 101, the base station receives a first paging message sent by an MME.

The foregoing first paging message includes coverage enhancement information of UE to be paged by using the first paging message.

In this embodiment of the present application, when the MME initiates paging to the UE (the UE may be referred to as to-be-paged UE), the MME sends the first paging message to all base stations (e.g., eNodeBs) within a range of a tracking area (TA) of the UE. Generally, there are multiple base stations within the TA of the to-be-paged UE, and the MME sends the first paging message to the multiple base stations within the tracking area of the to-be-paged UE. After a paging procedure is initiated, the base stations within the TA receive the first paging message sent by the MME. In this embodiment of the present application, in addition to carrying signaling required for paging, the first paging message delivered by the MME to the base stations includes the coverage enhancement information of the to-be-paged UE. Therefore, the base stations may obtain, by using the first paging message received from the MME, the coverage enhancement information of the UE that is sent by the MME.

Specifically, the first paging message sent by the MME to the base station may include an identity index value of the UE and/or a paging identity of the UE. The paging identity may include an international mobile subscriber identity (IMSI) or an S-temporary mobile subscriber identity (S-TMSI) of the UE. The IMSI or the S-TMSI may be used to identify the UE.

In this embodiment of the present application, the MME obtains the coverage enhancement information of the to-be-paged UE, and then, the MME determines whether to send a first paging message to a base station within the TA of the UE. If the MME determines to send a first paging message to a base station, the MME sends a first paging message to the base station, and adds the coverage enhancement information of the UE to the first paging message. Therefore, the base station may receive the foregoing first paging message.

It should be noted that in this embodiment of the present application, the coverage enhancement information of the UE includes at least one or more types of the following content: the UE requires coverage enhancement, the UE does not require coverage enhancement, a coverage enhancement level about the UE, a repetition level about the UE, a repetition count about the UE, a quantity of retransmissions about the UE, a spreading factor about the UE, a narrowband bandwidth about the UE, a time interval bundle size about the UE, a number of continuous attempts about the UE, or a power spectrum density boosting multiple about the UE. It may be understood that in this embodiment of the present application, any information that can directly or indirectly reflect (or distinguish or embody) channel quality, signal transmission quality, or signal strength may be used as the coverage enhancement information. Alternatively, any information that can directly or indirectly reflect (or distinguish or embody) different channel quality, different signal transmission quality, or different signal strength may be used as the coverage enhancement information. For example, coverage enhancement of the UE may be one or more of repeated transmission, spread spectrum transmission, retransmission, transmission time interval bundling, narrowband (such as subcarrier scheduling) transmission, ultra-narrowband (such as bandwidth of tens of hertz to dozens of kilohertz) transmission, power spectrum density boosting transmission, requirement relaxation transmission, or continuous transmission attempts.

It should be noted that in some embodiments of the present application, the paging message transmission method provided in this embodiment of the present application may further include the following step.

At step A1, the base station sends coverage enhancement information of the base station to the MME.

The base station reports the coverage enhancement information of the base station to the MME, so that the MME determines, according to the coverage enhancement information of the base station that is reported by the base station, whether to send a first paging message to the foregoing base station. Specifically, in this embodiment of the present application, the coverage enhancement information of the base station may include at least one or more types of the following content: the base station supports coverage enhancement, the base station does not support coverage enhancement, a coverage enhancement level supported by the base station, a highest coverage enhancement level supported by the base station, a quantity of coverage enhancement levels supported by the base station, an index of a coverage enhancement level supported by the base station, a repetition level supported by the base station, a highest repetition level supported by the base station, a repetition count supported by the base station, a maximum repetition count supported by the base station, a quantity of retransmissions that is supported by the base station, a maximum quantity of retransmissions that is supported by the base station, a maximum spreading factor supported by the base station, a minimum narrowband supported by the base station, a maximum time interval bundle supported by the base station, or a maximum power spectrum density boosting multiple supported by the base station.

Coverage enhancement in the present application may be one or more of repeated transmission, spread spectrum transmission, retransmission, transmission time interval bundling, narrowband (such as subcarrier scheduling) transmission, ultra-narrowband (such as bandwidth of tens of hertz to dozens of kilohertz) transmission, power spectrum density boosting transmission, requirement relaxation transmission, or continuous transmission attempts.

The base station sends the coverage enhancement information of the base station to the MME, so that the MME determines, according to the coverage enhancement information of the base station, whether to send a first paging message to the base station, so as to optimize resource utilization in a Long Term Evolution (3GPP or 4G technology) (LTE) system.

At step 102, the base station sends a second paging message to UE according to coverage enhancement information of the UE.

In this embodiment of the present application, the base station obtains the coverage enhancement information of the UE from the first paging message, and then, the base station may send the second paging message to the UE according to the coverage enhancement information. That is, because the base station may determine a coverage enhancement requirement status of the UE by using the obtained coverage enhancement information of the UE, the base station may send the second paging message with reference to the coverage enhancement requirement status of the UE. The second paging message sent according to the coverage enhancement requirement status of the UE may meet a coverage enhancement requirement of the UE, so that the UE can normally receive the second paging message.

It should be noted that in this embodiment of the present application, based on different execution bodies for sending paging messages, different message content, and different receiving objects, the paging messages are differently described according to "first" and "second." A paging message (which is also referred to as a PAGING message) sent by the MME to the base station is defined as the "first paging message," and a paging message (which may also be referred to as a Paging message) sent by the base station to the UE is defined as the "second paging message." In addition, in this embodiment of the present application, the first paging message carries the coverage enhancement information of the UE, but the second paging message does not need to carry the coverage enhancement information of the UE.

It should be noted that in this embodiment of the present application, for step 102 that the base station sends a second paging message to UE according to coverage enhancement information of the UE, there may be multiple implementation manners, which are separately described in the following by using multiple examples.

In an implementation manner scenario, the coverage enhancement information of the UE indicates that the UE requires coverage enhancement, and step 102 that the base station sends a second paging message to UE according to coverage enhancement information of the UE may specifically include the following step B1 or step B2. At step B1, when the base station determines that the base station supports coverage enhancement, the base station sends the second paging message to the UE in a coverage enhancement manner supported by the base station. At step B2, when the base station determines that the base station does not support coverage enhancement, the base station sends the second paging message to the UE in a non-coverage enhancement manner.

That is, when the base station determines, by using the coverage enhancement information of the UE, that the UE requires coverage enhancement, the base station determines whether the base station supports coverage enhancement. When the base station supports coverage enhancement, the base station may send the second paging message to the UE in the coverage enhancement manner supported by the base station. For example, the coverage enhancement information of the UE indicates that the UE requires coverage enhancement. If the base station supports a coverage enhancement level 1, a coverage enhancement level 2, and a coverage enhancement level 3, the base station sends the second paging message to the UE according to the coverage enhancement level 1, the coverage enhancement level 2, or the coverage enhancement level 3. When the base station does not support coverage enhancement, the coverage enhancement information of the UE is invalid for the base station, and the base station may send the second paging message to the UE in the non-coverage enhancement manner. That is, the base station does not perform any coverage enhancement; instead, the base station sends the second paging message to the UE in a normal manner. It may be understood that in some embodiments of the present application, non-coverage enhancement may be used as a lowest coverage enhancement level.

Further, the foregoing step B1 that the base station sends the second paging message to the UE in a coverage enhancement manner supported by the base station may specifically include step B11.

At step B11, the base station sends the second paging message to the UE according to a highest coverage enhancement level or a lowest coverage enhancement level, where the highest coverage enhancement level or the lowest coverage enhancement level is supported by the base station.

That is, when the base station chooses to send the second paging message in the coverage enhancement manner supported by the base station, the base station may specifically send the second paging message according to the highest coverage enhancement level or the lowest coverage enhancement level, where the highest coverage enhancement level or the lowest coverage enhancement level is supported by the base station. For example, the coverage enhancement information of the UE indicates that the UE requires coverage enhancement, and if the highest coverage enhancement level supported by the base station is the coverage enhancement level 1, the base station sends the second paging message to the UE according to the coverage enhancement level 1.

In another implementation manner scenario, the coverage enhancement information of the UE indicates the coverage enhancement level about the UE, and step 102 that the base station sends a second paging message to UE according to coverage enhancement information of the UE may specifically include step C1, step C2, or step C3. At step C1, when a highest coverage enhancement level supported by the base station is higher than or equal to the coverage enhancement level about the UE, the base station sends the second paging message to the UE according to the coverage enhancement level about the UE. At step C2, when a highest coverage enhancement level supported by the base station is lower than the coverage enhancement level about the UE, the base station sends the second paging message to the UE according to the highest coverage enhancement level supported by the base station. At step C3, when the base station determines that the base station does not support coverage enhancement, the base station sends the second paging message to the UE in a non-coverage enhancement manner.

That is, if the coverage enhancement information of the UE indicates the coverage enhancement level about the UE, the base station may determine, by using the coverage enhancement information of the UE, the coverage enhancement level required by the UE. If the base station does not support coverage enhancement, the base station performs step C3. If the base station supports coverage enhancement, the base station compares the coverage enhancement level about the UE with the highest coverage enhancement level supported by the base station, so as to choose to perform step C1 or step C2. Step C1 and step C2 may further be similarly described as the following step.

The base station sends the second paging message to the UE according to a coverage enhancement level x, where x=min (the coverage enhancement level about the UE, the highest coverage enhancement level supported by the base station), and min is a minimum value function. For example, the coverage enhancement information of the UE that is included in the first paging message sent by the MME indicates that the coverage enhancement level about the UE is a coverage enhancement level 3, and the highest coverage enhancement level that can be supported by the base station is a coverage enhancement level 1. Because the base station cannot support the coverage enhancement level 3, the base station sends the second paging message to the UE according to the highest coverage enhancement level 1 that can be supported by the base station.

It should be noted that in some embodiments of the present application, the coverage enhancement information of the UE indicates the coverage enhancement level about the UE, and after step 101 that the base station receives a first paging message sent by an MME, the paging message transmission method provided in this embodiment of the present application may further include the following step D1. At step D1, when a difference between a highest coverage enhancement level supported by the base station and the coverage enhancement level about the UE does not meet a preset first condition, the base station does not send the second paging message to the UE. After step 102, that the base station sends a second paging message to UE according to coverage enhancement information of the UE may be specifically the following step D2. At step D2, when a difference between a highest coverage enhancement level supported by the base station and the coverage enhancement level about the UE meets a preset first condition, the base station sends the second paging message to the UE according to the coverage enhancement information of the UE.

For the foregoing step D1, after the first condition is set, when the difference between the highest coverage enhancement level supported by the base station and the coverage enhancement level about the UE does not meet the first condition, the base station may not send the second paging message to the UE, that is, the base station may not send the second paging message when the first condition is not met. The first condition may be that the difference is greater than a pre-specified value, such as 1, 0, or −1; or the first condition may be that the difference is equal to a pre-specified value, or that the difference is less than a pre-specified value. For example, the first condition may be set as follows: the difference is less than 2. If the highest coverage enhancement level supported by the base station is a coverage enhancement level 1, and the coverage enhancement level about the UE is a coverage enhancement level 2, the difference between the highest coverage enhancement level supported by the base station and the coverage enhancement level about the UE is 1. In this case, according to the specified first condition (the difference is less than 2), it is obviously that 1<2, and the first condition can be met. In this case, the base station may send the second paging message.

In the foregoing step D2, when the difference between the highest coverage enhancement level supported by the base station and the coverage enhancement level about the UE meets the preset first condition, the base station sends the second paging message to the UE according to the coverage enhancement information of the UE. In this case, that the base station sends the second paging message to the UE according to the coverage enhancement information of the UE may specifically refer to the implementation manner described in the foregoing step C1 or C2. Details are not described herein again.

In some embodiments of the present application, the paging message transmission method provided in this embodiment of the present application further includes the following step E1 or step E2. At step E1, the base station receives the coverage enhancement information of the UE that is reported by the UE. At step E2, the base station receives the coverage enhancement information of the UE, and the base station reports the coverage enhancement information of the UE to the MME.

That is, in this embodiment of the present application, the UE may further report the coverage enhancement information of the UE to the base station, and the base station may receive the coverage enhancement information of the UE. For example, the UE reports the coverage enhancement information of the UE to the base station by using access stratum signaling. In addition, in some other embodiments of the present application, after the base station receives the coverage enhancement information of the UE, the base station may further report the coverage enhancement information of the UE to the MME. For example, the base station notifies the MME of the coverage enhancement information of the UE by using an X2 interface.

In some embodiments of the present application, the paging message transmission method provided in this embodiment of the present application further includes the following steps.

The base station receives terminal information reported by the UE.

The base station determines, according to supported-terminal information of the base station, whether the base station supports the UE.

If the base station does not support the UE, the base station does not send the second paging message to the UE.

In the foregoing implementation scenario, the terminal information may specifically indicate a category (category) of a terminal, and/or information about a low-cost (or low-complexity) technology supported by the terminal, and/or information about a service supported by the terminal. The supported-terminal information includes a terminal category of UE supported by the base station, and/or low-cost (or low-complexity) information of the UE supported by the base station, and/or service information of the UE supported by the base station. That is, a terminal category and UE having low-cost information and service information may be determined by using the supported-terminal information of the base station, where the terminal category and the UE are supported by the base station. If the base station does not support a type of UE at all, the base station may not send the second paging message to this type of UE. In addition, in this embodiment of the present application, the base station may further send the supported-terminal information of the base station to the MME, so that the MME obtains the terminal category and the UE having the low-cost information and the service information, where the terminal category and the UE are supported by the base station.

It should be noted that in the foregoing described supported-terminal information, the low-cost technology may be one or more of bandwidth reduction, peak data rate reduction, a single receive antenna, complexity reduction, half-duplex, transmission mode reduction, or transmit power reduction of user equipment. A service type may be a machine type service, and/or a low-delay service, and/or a low-power service.

For example, if a base station does not support (or does not serve) UE whose type is a category n, when the MME sends, to the base station that does not support the UE having the category n, a first paging message associated with the UE (to-be-paged UE) whose type is the category n, the base station does not send a second paging message related to the to-be-paged UE. In this way, information transmission overheads of the base station may be reduced, resources may be saved, and device power consumption may be reduced.

For another example, if a base station does not support a low-cost technology used by to-be-paged UE, when the MME sends a first paging message associated with the to-be-paged UE to the base station, the base station does not send a second paging message related to the to-be-paged UE. For another example, if a base station does not support a service type used by to-be-paged UE, when the MME sends a first paging message associated with the to-be-paged UE to the base station, the base station does not send a second paging message related to the to-be-paged UE.

For example, if UE (that is, to-be-paged UE) to be paged by the MME is UE 1 whose type is a category 0, the MME sends a first paging message associated with the UE 1 to a base station 1, a base station 2, and a base station 3. The base station 1 and the base station 2 support paging for UE whose type is the category 0, and the base station 3 does not support paging for the UE whose type is the category 0. The base station 1 and the base station 2 each send, according to the first paging message that is associated with UE 1 and is sent by the MME, a second paging message related to the UE 1. Because the base station 3 does not support paging for the UE whose type is the category 0, the base station 3 does not send a second paging message related to the UE 1.

From the foregoing description that is given on a base station side and is about the paging message transmission method provided in this embodiment of the present application, it can be learned that when a service is provided, based on an LTE system, to user equipment, network coverage of the user equipment needs to be enhanced. When paging UE (the UE may be referred to as to-be-paged UE), the MME first sends a first paging message to a base station within a tracking area of the UE, and then, the base station sends a second paging message to the to-be-paged UE. Generally, there are multiple base stations within the tracking area of the to-be-paged UE, and the MME sends the first paging message to the multiple base stations within the tracking area of the to-be-paged UE. In one aspect, the base stations that receive the first paging message sent by the MME do not know whether the to-be-paged UE camps (or stays) on the base stations. Certainly, the base stations do not know coverage enhancement information of the to-be-paged UE either. A problem to be resolved in the present application is as follows: The base stations obtain the coverage enhancement information of the to-be-paged UE, and take proper coverage enhancement measures (for example, select proper coverage enhancement levels) according to the coverage enhancement information of the to-be-paged UE. In another aspect, in the base stations that receive the first paging message sent by the MME, some base stations may support coverage enhancement, and some base stations may not support coverage enhancement. It is also possible that coverage enhancement levels that can be supported by the base stations supporting coverage enhancement are not always totally the same. For the to-be-paged UE that requires coverage enhancement, considering that coverage enhancement support degrees of the base stations may be different, how the MME sends the first paging message to the base stations and how the base stations send paging messages to the to-be-paged UE are also problems to be resolved in the present application. In addition, it is assumed that a to-be-paged terminal is a low-cost (or low-complexity) terminal. For example, the low-cost terminal is a new type of user equipment. Generally, the MME needs to send a first paging message of the to-be-paged terminal to one or more base stations within a tracking area. However, actually, some base stations within the tracking area may not support the low-cost terminal. In this case, how to optimize first paging message transmission between the MME and the base stations is also a problem to be resolved in the present application. By using the foregoing embodiment description, a manner that a base station should use to send the second paging message is determined, and a case in which the second paging message is not sent is also described. The base station may determine, according to a coverage enhancement support degree of the base station (for example, that the base station does not support coverage enhancement, that the base station supports coverage enhancement, or a highest coverage enhancement level supported by the base station), a proper transmission manner (for example, non-coverage enhancement transmission or a coverage enhancement level used in coverage enhancement transmission) used to send the second paging message to the UE. Therefore, operation behavior of each entity in the LTE system is identified, resource utilization in the system is optimized, and the UE is effectively covered.

It can be learned from the foregoing embodiment description about the present application that, an MME sends a first paging message to a base station, and the first paging message includes coverage enhancement information of UE to be paged by using the first paging message. The base station may obtain the coverage enhancement information of the UE from the first paging message sent by the MME, and the base station may send a second paging message to the UE according to the foregoing coverage enhancement information of the UE. Because the base station sends the second paging message to the UE according to the coverage enhancement information of the UE, it is ensured that the UE can normally receive the second paging message sent by the base station, and the UE can be effectively covered.

Figure 2:
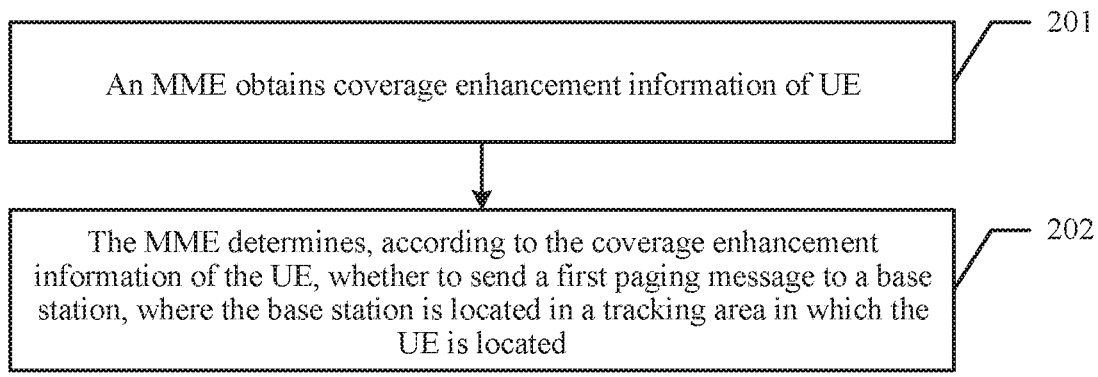
FIG. 2 is a schematic block flowchart of another paging message transmission method according to an embodiment of the present application.

The foregoing describes the paging message transmission method in the present application on a base station side. Another paging message transmission method provided in the embodiments of the present application is described in the following, and can be applied to an MME. Referring to FIG. 2, a paging message transmission method provided in an embodiment of the present application may include the following steps.

At step 201, the MME obtains coverage enhancement information of UE.

In this embodiment of the present application, the MME obtains the coverage enhancement information of the UE to be paged by the MME. The MME may query the coverage enhancement information of the UE from a base station, or a base station may report the coverage enhancement information of the UE to the MME, or the UE may report the coverage enhancement information of the UE to the MME. After obtaining the coverage enhancement information of the UE, the MME may determine a coverage enhancement requirement status of the UE by using the coverage enhancement information of the UE.

It should be noted that in this embodiment of the present application, the coverage enhancement information of the UE includes at least one or more types of the following content: the UE requires coverage enhancement, the UE does not require coverage enhancement, a coverage enhancement level about the UE, a repetition level about the UE, a repetition count about the UE, a quantity of retransmissions about the UE, a spreading factor about the UE, a narrowband bandwidth about the UE, a time interval bundle size about the UE, a number of continuous attempts about the UE, or a power spectrum density boosting multiple about the UE. It may be understood that in this embodiment of the present application, any information that can directly or indirectly reflect (or distinguish or embody) channel quality, signal transmission quality, or signal strength may be used as the coverage enhancement information. Alternatively, any information that can directly or indirectly reflect (or distinguish or embody) different channel quality, different signal transmission quality, or different signal strength may be used as the coverage enhancement information. For example, coverage enhancement may be one or more of repeated transmission, spread spectrum transmission, retransmission, transmission time interval bundling, narrowband (such as subcarrier scheduling) transmission, ultra-narrowband (such as bandwidth of tens of hertz to dozens of kilohertz) transmission, power spectrum density boosting transmission, requirement relaxation transmission, or continuous transmission attempts.

At step 202, the MME determines, according to the coverage enhancement information of the UE, whether to send a first paging message to a base station, where the base station is located in a tracking area in which the UE is located.

In this embodiment of the present application, after the MME obtains the coverage enhancement information of the to-be-paged UE, the MME may obtain the coverage enhancement requirement status of the UE by means of parsing, so that the MME may determine, with reference to the coverage enhancement requirement status of the UE, whether to send a first paging message to the base station within the tracking area in which the UE is located. This manner of determining, according to the coverage enhancement requirement status of the UE, whether to send a first paging message may meet a coverage enhancement requirement of the UE.

In this embodiment of the present application, generally, there are multiple base stations within the tracking area of the to-be-paged UE, and for each base station within the tracking area of the to-be-paged UE, the MME needs to determine whether to send a first paging message.

It should be noted that in this embodiment of the present application, for step 202 that the MME determines, according to the coverage enhancement information of the UE, whether to send a first paging message to a base station, there may be multiple implementation manners, which are separately used described in the following by using multiple examples.

In an implementation manner scenario, step 202 that the MME determines, according to the coverage enhancement information of the UE, whether to send a first paging message to a base station includes the following step F1.

At step F1, when the coverage enhancement information of the UE indicates that the UE requires coverage enhancement, the MME determines to send a first paging message to the base station, where the first paging message includes the coverage enhancement information of the UE.

In this implementation scenario, after step F1 that the MME determines to send a first paging message to the base station, the paging message transmission method provided in this embodiment of the present application may further include the following step F2.

At step F2, the MME sends a first paging message to the base station, where the first paging message includes the coverage enhancement information of the UE.

That is, if the MME knows, by using the coverage enhancement information of the UE, that the UE requires coverage enhancement, the MME may determine to send a first paging message to the base station within the tracking area in which the UE is located. In this embodiment of the present application, in addition to carrying signaling required for paging, the first paging message delivered by the MME to the base station includes the coverage enhancement information of the UE that is obtained by the MME. Therefore, the base station may obtain, by parsing the first paging message received from the MME, the coverage enhancement information of the UE that is sent by the MME.

In some embodiments of the present application, the paging message transmission method provided in this embodiment of the present application may further include the following step G1.

At step G1, the MME receives coverage enhancement information of the base station that is sent by the base station.

The base station reports the coverage enhancement information of the base station to the MME, so that the MME determines, according to the coverage enhancement information of the base station that is reported by the base station, whether to send a first paging message to the foregoing base station. Specifically, in this embodiment of the present application, the coverage enhancement information of the base station may include at least one or more types of the following content: the base station supports coverage enhancement, the base station does not support coverage enhancement, a coverage enhancement level supported by the base station, a highest coverage enhancement level supported by the base station, a quantity of coverage enhancement levels supported by the base station, an index of a coverage enhancement level supported by the base station, a repetition level supported by the base station, a highest repetition level supported by the base station, a repetition count supported by the base station, a maximum repetition count supported by the base station, a quantity of retransmissions that is supported by the base station, a maximum quantity of retransmissions that is supported by the base station, a maximum spreading factor supported by the base station, a minimum narrowband supported by the base station, a maximum time interval bundle supported by the base station, or a maximum power spectrum density boosting multiple supported by the base station. For example, coverage enhancement of the base station may be a support status of the base station for one or more of repeated transmission, spread spectrum transmission, retransmission, transmission time interval bundling, narrowband (such as subcarrier scheduling) transmission, ultra-narrowband (such as bandwidth of tens of hertz to dozens of kilohertz) transmission, power spectrum density boosting transmission, requirement relaxation transmission, or continuous transmission attempts. The base station sends the coverage enhancement information of the base station to the MME, so that the MME determines, according to the coverage enhancement information of the base station, whether to send a first paging message to the base station, so as to optimize resource utilization in an LTE system.

Based on the foregoing implementation scenario of step G1, in some embodiments of the present application, step 202 that the MME determines, according to the coverage enhancement information of the UE, whether to send a first paging message to a base station specifically includes the following step H1.

At step H1, when the coverage enhancement information of the UE indicates that the UE requires coverage enhancement and the coverage enhancement information of the base station indicates that the base station supports coverage enhancement, the MME determines to send a first paging message to the base station, where the first paging message includes the coverage enhancement information of the UE.

In this implementation scenario, after step H1 that the MME determines to send a first paging message to the base station, the paging message transmission method provided in this embodiment of the present application may further include the following step H2.

At step H2, the MME sends a first paging message to the base station, where the first paging message includes the coverage enhancement information of the UE.

Based on the foregoing implementation scenario of step G1, in some embodiments of the present application, step 202 that the MME determines, according to the coverage enhancement information of the UE, whether to send a first paging message to a base station specifically includes the following step.

When the coverage enhancement information of the UE indicates that the UE requires coverage enhancement and the coverage enhancement information of the base station indicates that the base station does not support coverage enhancement, the MME determines not to send a first paging message to the base station.

That is, the MME determines, by using the coverage enhancement information of the UE that the UE requires coverage enhancement, but the MME determines, from the coverage enhancement information of the base station that is reported by the base station, that the base station cannot support coverage enhancement. In this case, the MME may determine not to send a first paging message to the foregoing base station, so as to avoid resource waste of the MME. That is, the MME does not send the first paging message to a base station that does not support coverage enhancement; instead, the MME sends the first paging message to a base station that supports coverage enhancement.

Based on the foregoing implementation scenario of step G1, in some embodiments of the present application, step 202 that the MME determines, according to the coverage enhancement information of the UE, whether to send a first paging message to a base station specifically includes the following step.

When the coverage enhancement information of the UE indicates that the UE requires coverage enhancement and the coverage enhancement information of the base station indicates that the base station does not support coverage enhancement, the MME determines to send a first paging message to the base station, where the first paging message does not include the coverage enhancement information of the UE.

That is, the MME determines, by using the coverage enhancement information of the UE that the UE requires coverage enhancement, but the MME determines, from the coverage enhancement information of the base station that is reported by the base station, that the base station cannot support coverage enhancement. In this case, the MME may determine to send a first paging message to the foregoing base station, but the MME does not add the coverage enhancement information of the UE to the first paging message. The MME sends, to a base station that does not support coverage enhancement, the first paging message that does not include the coverage enhancement information of the UE.

Based on the foregoing implementation scenario of step G1, in some embodiments of the present application, step 202 that the MME determines, according to the coverage enhancement information of the UE, whether to send a first paging message to a base station specifically includes the following step I1.

At step I1, when a difference between a highest coverage enhancement level supported by the base station and a coverage enhancement level about the UE meets a preset first condition, the MME determines to send a first paging message to the base station, where the first paging message includes the coverage enhancement information of the UE.

In this implementation scenario, after step I1 that the MME determines to send a first paging message to the base station, the paging message transmission method provided in this embodiment of the present application may further include the following step I2.

At step I2, the MME sends a first paging message to the base station.

For the foregoing step I1, after the first condition is set, when the difference between the highest coverage enhancement level supported by the base station and the coverage enhancement level about the UE meets the first condition, the MME may further send the first paging message to the base station, that is, the MME may not send the first paging message when the first condition is not met. The first condition may be that the difference is greater than a pre-specified value, such as 1, 0, or −1; or the first condition may be that the difference is equal to a pre-specified value, or that the difference is less than a pre-specified value.

Based on the foregoing implementation scenario of step G1, in some embodiments of the present application, step 202 that the MME determines, according to the coverage enhancement information of the UE, whether to send a first paging message to a base station specifically includes the following step.

When a difference between a highest coverage enhancement level supported by the base station and a coverage enhancement level about the UE does not meet a preset first condition, the MME determines not to send a first paging message to the base station.

In some embodiments of the present application, the paging message transmission method provided in this embodiment of the present application may further include one or more of the following steps J1 or J2.

At step J1, the MME receives supported-terminal information of the base station that is sent by the base station.

At step J2, the MME obtains terminal information sent by the to-be-paged UE.

In this implementation scenario, step 202 that the MME determines, according to the coverage enhancement information of the UE, whether to send a first paging message to a base station may specifically include the following step J3 or step J4. At step J3, if the base station does not support a type of the to-be-paged UE, the MME determines not to send a first paging message to the base station. At step J4, if the base station supports a type of the to-be-paged UE, the MME determines to send a first paging message to the base station.

Specifically, the terminal information indicates a category of a terminal, and/or information about a low-cost technology supported by the terminal, and/or information about a service supported by the terminal. The supported-terminal information in the supported-terminal information of the base station includes a terminal category of UE supported by the base station, and/or low-cost information of the UE supported by the base station, and/or service information of the UE supported by the base station. That is, a terminal category and UE having low-cost information and service information may be determined by using the supported-terminal information of the base station, where the terminal category and the UE are supported by the base station. If the base station does not support the UE at all, the MME may determine not to send a first paging message to the base station. In addition, in this embodiment of the present application, the base station may further send the supported-terminal information of the base station to the MME, so that the MME obtains the terminal category and the UE having the low-cost information and the service information, where the terminal category and the UE are supported by the base station, and the MME can perform step J3 or J4 according to the supported-terminal information of the base station.

In the foregoing description given by using an example, the base station may notify the MME of information about whether the base station supports coverage enhancement, and/or the base station notifies the MME of information about the highest coverage enhancement level supported by the base station. For example, after knowing the information about whether the base station can support coverage enhancement, the MME may not send, to the base station that does not support coverage enhancement, the first paging message that includes the coverage enhancement information of the UE, so as to reduce resource overheads and improve resource utilization efficiency. That is, after knowing the information whether the base station can support coverage enhancement, the MME may send, to the base station that does not support coverage enhancement, only the first paging message that does not include the coverage enhancement information of the UE. For another example, for the base station that supports coverage enhancement, the MME may send, to the base station that supports coverage enhancement, the first paging message that includes the coverage enhancement information; or may send, to the base station that supports coverage enhancement, the first paging message that does not include the coverage enhancement information.

For example, if to-be-paged UE is UE having a category n, after the MME knows information about whether a base station can support the UE having the category n, the MME may send, only to a base station that supports the UE having the category n, a first paging message associated with the to-be-paged UE. That is, the MME may not send, to a base station that cannot support the UE having the category n, the first paging message associated with the UE having the category n. In this way, overheads of information transmission between the base station and the MME may be reduced, resources may be saved, and device power consumption may be reduced.

If the supported-terminal information of the base station indicates that a low-cost technology of a terminal supported by the base station does not include the low-cost technology used by the to-be-paged UE, the MME does not send the first paging message associated with the to-be-paged UE to the base station. If the supported-terminal information of the base station indicates that a service type of the terminal supported by the base station does not include a service type used by the to-be-paged UE, the MME does not send the first paging message associated with the to-be-paged UE to the base station. A specific embodiment is provided in the following.

If a base station 1, a base station 2, and a base station 3 are managed by an MME 1, the base station 1 and the base station 2 support paging for UE whose type is a category 0, and the base station 3 does not support paging for the UE whose type is the category 0, the base station 1 and the base station 2 respectively notify the MME of information that the base station 1 supports the UE whose type is the category 0 and information that the base station 2 supports the UE whose type is the category 0, and the base station 3 notifies the MME of information that the base station 3 does not support the UE whose type is the category 0. When UE (that is, to-be-paged UE) to be paged by the MME is UE1 whose type is the category 0, the MME sends a first paging message associated with the UE1 to the base station 1 and the base station 2, and the MME does not send the first paging message associated with the UE1 to the base station 3.

In this embodiment of the present application, after the MME knows information about a highest coverage enhancement level that can be supported by a base station, if a difference between a coverage enhancement level about UE and the highest coverage enhancement level that can be supported by the base station meets a specific first condition, where the coverage enhancement level about the UE is indicated by coverage enhancement information of the UE that is included in a first paging message to be sent by the MME to the base station, the MME sends the first paging message to the base station, so as to reduce resource overheads and improve resource utilization efficiency. After the MME knows information about a highest coverage enhancement level that can be supported by a base station, if a difference between a coverage enhancement level about UE and the highest coverage enhancement level that can be supported by the base station does not meet a first condition, where the coverage enhancement level about the UE is indicated by coverage enhancement information included in a PAGING message to be sent by the MME to the base station, the MME does not send the first paging message to the base station, so as to reduce resource overheads and improve resource utilization efficiency.

It can be learned from the foregoing embodiment description about the method in the present application that, an MME may determine, according to coverage enhancement information of UE and coverage enhancement information of a base station, whether to send a first paging message to the base station. The MME may determine, according to a coverage enhancement support degree of the base station (for example, that the base station does not support coverage enhancement, that the base station supports coverage enhancement, or a highest coverage enhancement level supported by the base station), whether to send a first paging message, so that the base station can use a proper transmission manner (for example, non-coverage enhancement transmission or a coverage enhancement level used in coverage enhancement transmission). Therefore, operation behavior of each entity in a system is identified, overheads of signaling between the base station and the MME are reduced, unnecessary PAGING message transmission between the MME and the base station is avoided, system resources are saved, resource utilization efficiency is improved, and system resource utilization and paging message transmission are optimized.

Figure 3:
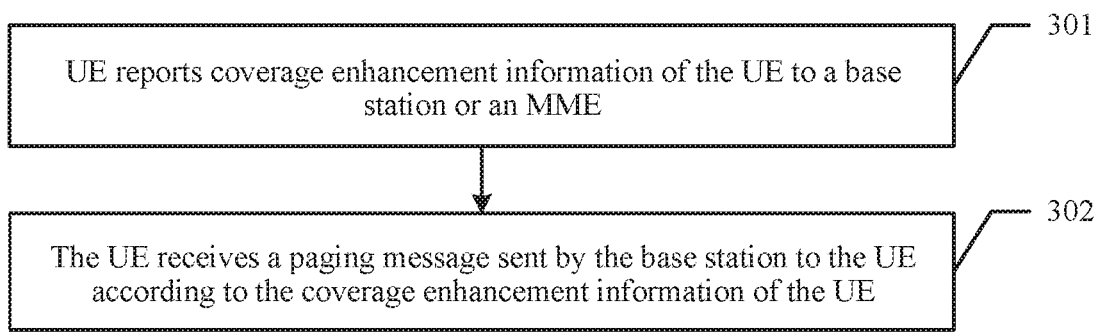
FIG. 3 is a schematic block flowchart of another paging message transmission method according to an embodiment of the present application.

The foregoing describes the paging message transmission method in the present application on a base station side and an MME side. Another paging message transmission method provided in the embodiments of the present application is described in the following, and can be applied to UE. Referring to FIG. 3, a paging message transmission method provided in an embodiment of the present application may include the following steps.

At step 301, the UE reports coverage enhancement information of the UE to a base station or an MME.

In this embodiment of the present application, the UE first reports the coverage enhancement information of the UE to the base station or the MME. For example, the UE reports the coverage enhancement information of the UE to the base station by using access stratum signaling. After the base station receives the coverage enhancement information of the UE, the base station may further report the coverage enhancement information of the UE to the MME. For example, the base station notifies the MME of the coverage enhancement information of the UE by using an X2 interface. In addition, the UE may transparently transmit the coverage enhancement information of the UE to the MME by using the base station.

It should be noted that in this embodiment of the present application, the coverage enhancement information of the UE includes at least one or more types of the following content: the UE requires coverage enhancement, the UE does not require coverage enhancement, a coverage enhancement level about the UE, a repetition level about the UE, a repetition count about the UE, a quantity of retransmissions about the UE, a spreading factor about the UE, a narrowband bandwidth about the UE, a time interval bundle size about the UE, a number of continuous attempts about the UE, or a power spectrum density boosting multiple about the UE. It may be understood that in this embodiment of the present application, any information that can directly or indirectly reflect (or distinguish or embody) channel quality, signal transmission quality, or signal strength may be used as the coverage enhancement information. Alternatively, any information that can directly or indirectly reflect (or distinguish or embody) different channel quality, different signal transmission quality, or different signal strength may be used as the coverage enhancement information. For example, coverage enhancement of the UE may be one or more of repeated transmission, spread spectrum transmission, retransmission, transmission time interval bundling, narrowband (such as subcarrier scheduling) transmission, ultra-narrowband (such as bandwidth of tens of hertz to dozens of kilohertz) transmission, power spectrum density boosting transmission, requirement relaxation transmission, or continuous transmission attempts.

For example, the coverage enhancement information of the UE may indicate whether coverage enhancement is required (or supported). For example, the coverage enhancement information is one bit. A bit state o indicates that coverage enhancement is not required; a bit state 1 indicates that coverage enhancement is required. For another example, the coverage enhancement information may indicate one or more of a coverage enhancement level (or level), a repetition count, a quantity of retransmissions, a spreading factor, a narrowband, a time interval bundle, a number of continuous attempts, or a power spectrum density boosting multiple. For another example, the coverage enhancement information may indicate one or more of resources (one or more of a time resource, a frequency resource, a codeword resource, or a power resource) having different coverage enhancement levels, or indexes of resources having different coverage enhancement levels. For another example, the coverage enhancement information is two bits. A bit state 00 indicates that coverage enhancement is not required; a bit state 01 indicates that a coverage enhancement level 1 is required; a bit state 10 indicates that a coverage enhancement level 2 is required; a bit state 11 indicates that a coverage enhancement level 3 is required. For another example, the coverage enhancement information is two bits. A bit state 00 indicates that coverage enhancement is not required; a bit state 01 indicates that a low coverage enhancement level is required; a bit state 10 indicates that a medium coverage enhancement level is required; a bit state 11 indicates that a high coverage enhancement level is required. For another example, the coverage enhancement information is m bits, and m is a positive integer greater than 1. The first bit indicates whether coverage enhancement is required, and the second bit to the $m^{th}$ bit indicate a level used when coverage enhancement is required.

It should be noted that in the foregoing embodiment description in the present application, the coverage enhancement level may be a coverage enhancement level that is of a physical random access channel (PRACH) and that is used after the UE completes random access. The coverage enhancement level may be a coverage enhancement level that is of a PRACH and that is used after the UE completes most recent random access. The coverage enhancement level may be a coverage enhancement level that is used by the UE to send or receive a pre-defined reference channel. Particularly, the coverage enhancement level is a coverage enhancement level that is notified by the base station to the UE and is used by the UE to receive a second paging message. The UE may determine, from cell-specific configured coverage enhancement levels, a coverage enhancement level as the coverage enhancement level used to receive the second paging message.

It should be noted that in this embodiment of the present application, the paging message transmission method provided in this embodiment of the present application may further include the following step K1.

At step K1, the UE determines whether the UE requires coverage enhancement; and if the UE does not require coverage enhancement, the UE adds, to the coverage enhancement information of the UE, information that the UE does not require coverage enhancement; or if the UE requires coverage enhancement, the UE adds, to the coverage enhancement information of the UE, information that the UE requires coverage enhancement.

Specifically, for step K1 that the UE determines whether the UE requires coverage enhancement, there may be multiple implementation manners, which are separately described in the following by using examples. In example K11, the UE determines whether a reference signal received power (RSRP) of the UE is greater than a first threshold; and if the RSRP is greater than or equal to the first threshold, the UE determines that the UE does not require coverage enhancement; or if the RSRP is less than the first threshold, the UE determines that the UE requires coverage enhancement. In example K12, the UE determines whether a path loss of the UE is less than a second threshold; and if the path loss is less than the second threshold, the UE determines that the UE does not require coverage enhancement; or if the path loss is greater than or equal to the second threshold, the UE determines that the UE requires coverage enhancement. In example K13, the UE determines whether detection performed by the UE on a physical random access channel meets a preset second condition; and if the detection on the physical random access channel meets the preset second condition, the UE determines that the UE does not require coverage enhancement; or if the detection on the physical random access channel does not meet the preset second condition, the UE determines that the UE requires coverage enhancement. In example K14, the UE determines whether a random access process completed by the UE meets a preset third condition; and if the random access process completed by the UE meets the preset third condition, the UE determines that the UE does not require coverage enhancement; or if the random access process completed by the UE does not meet the preset third condition, the UE determines that the UE requires coverage enhancement.

In the foregoing embodiment, considering that the UE may move, when the coverage enhancement information of the UE changes, the UE needs to send updated coverage enhancement information to the MME and/or the base station. The UE may start random access and report the updated coverage enhancement information to the MME and/or the base station. For example, the first threshold is specified, and if the RSRP measured by the UE is greater than the threshold, it indicates that the UE does not require coverage enhancement; or the second threshold may be set, and if the path loss measured by the UE is less than the second threshold, it indicates that the UE does not require coverage enhancement. If the RSRP measured by the UE is less than the first threshold (or the path loss is greater than the second threshold), it indicates that the UE requires coverage enhancement. For another example, the second condition (or the third condition) may be set as follows: duration is longer than specific duration or a quantity of times is greater than a specific quantity of times. A timer is specified, and if a time for detecting a specific channel (such as a PRACH) or completing a specific process (such as a random access process) by the UE is shorter than a longest timing time of the timer, it indicates that the UE does not require coverage enhancement. For another example, a counter is specified, and if a quantity of times of detecting a specific channel (such as a PRACH) or completing a specific process (such as a random access process) by the UE is less than a largest count of the counter, it indicates that the UE does not require coverage enhancement. If a time for detecting a specific channel (such as a PRACH) or completing a specific process (such as a random access process) by the UE is longer than or equal to a time set on the timer (or a longest timing time of the timer), it indicates that the UE requires coverage enhancement. If a quantity of times of detecting a specific channel (such as a PRACH) or completing a specific process (such as a random access process) by the UE is greater than or equal to a quantity of times that is set on the counter (a largest count of the counter), it indicates that the UE requires coverage enhancement.

At step 302, the UE receives a paging message sent by the base station to the UE according to the coverage enhancement information of the UE.

In this embodiment of the present application, the UE receives the paging message sent by the base station. It should be noted that the paging message described in this embodiment is the second paging message that is sent by the base station and that is described in the foregoing embodiments. Because the base station may determine a coverage enhancement requirement status of the UE by using the obtained coverage enhancement information of the UE, the base station may send the second paging message with reference to the coverage enhancement requirement status of the UE. The second paging message sent according to the coverage enhancement requirement status of the UE may meet a coverage enhancement requirement of the UE, so that the UE can normally receive the second paging message.

In some embodiments of the present application, the paging message sending method provided in this embodiment of the present application may further include the following step L1.

At step L1, the UE obtains coverage enhancement information of the base station from a broadcast message of the base station.

In this implementation scenario, step 302 that the UE receives a paging message sent by the base station to the UE according to the coverage enhancement information of the UE includes the following step L2, step L3, or step L4. At step L2, when a highest coverage enhancement level supported by the base station is higher than or equal to a coverage enhancement level about the UE, the UE receives, according to the coverage enhancement level about the UE, the paging message sent by the base station. At step L3, when a highest coverage enhancement level supported by the base station is lower than a coverage enhancement level about the UE, the UE receives, according to the highest coverage enhancement level supported by the base station, the paging message sent by the base station. At step L4, when the base station does not support coverage enhancement, the UE receives, in a non-coverage enhancement manner, the paging message sent by the base station.

That is, the UE may obtain the coverage enhancement information of the base station from the broadcast message. The coverage enhancement information of the base station indicates whether the base station supports coverage enhancement and the highest coverage enhancement level that can be supported by the base station. If the base station does not support coverage enhancement, step L4 is performed. If the base station supports coverage enhancement, the UE compares the coverage enhancement level about the UE with the highest coverage enhancement level supported by the base station, so as to choose to perform step L2 or step L3. Step L2 and step L3 may further be similarly described as the following step.

The UE receives, according to a coverage enhancement level x, the paging message sent by the base station, where x=min (the coverage enhancement level about the UE, the highest coverage enhancement level supported by the base station), and min is a minimum value function. For example, the coverage enhancement information of the UE indicates that the coverage enhancement level about the UE is a coverage enhancement level 3, and the highest coverage enhancement level that can be supported by the base station is a coverage enhancement level 1. Because the base station cannot support the coverage enhancement level 3, the UE receives, according to the coverage enhancement level 1, the paging message sent by the base station.

In some embodiments of the present application, the paging message sending method provided in this embodiment of the present application may further include the following step M1.

At step M1, the UE obtains coverage enhancement information of the base station from a broadcast message of the base station.

In this implementation scenario, step 302, the UE receives a paging message sent by the base station to the UE according to the coverage enhancement information of the UE, and includes the following step M2, that when a difference between a highest coverage enhancement level supported by the base station and a coverage enhancement level about the UE does not meet a preset first condition, the UE does not receive the paging message sent by the base station. Step 302, the UE receives a paging message sent by the base station to the UE according to the coverage enhancement information of the UE, and includes specifically the following step M3. At step M3, when a difference between a highest coverage enhancement level supported by the base station and a coverage enhancement level about the UE meets a preset first condition, the UE receives the paging message sent by the base station.

For the foregoing step M2, after the first condition is set, if the difference between the highest coverage enhancement level supported by the base station and the coverage enhancement level about the UE does not meet the first condition, the UE may not receive the paging message sent by the base station. The first condition may be that the difference is greater than a pre-specified value, such as 1, 0, or −1; or the first condition may be that the difference is equal to a pre-specified value, or that the difference is less than a pre-specified value. For example, the first condition may be set as follows: the difference is greater than 2. If the highest coverage enhancement level supported by the base station is a coverage enhancement level 1, and the coverage enhancement level about the UE is a coverage enhancement level 2, the difference between the highest coverage enhancement level supported by the base station and the coverage enhancement level about the UE is 1. In this case, according to the specified first condition (the difference is greater than 2), it is obviously that 1<2, and the first condition cannot be met. In this case, the UE may not receive the paging message sent by the base station.

In the foregoing step M3, when the difference between the highest coverage enhancement level supported by the base station and the coverage enhancement level about the UE meets the preset first condition, the UE may receive the paging message sent by the base station. In this case, that the UE receives the paging message sent by the base station specifically refers to the implementation manner described in the foregoing step L2 or L3. Details are not described herein again.

In some embodiments of the present application, the paging message sending method provided in this embodiment of the present application may further include the following step N1.

At step N1, the UE reports terminal information of the UE to the base station and/or the MME.

In the foregoing implementation scenario, the terminal information may specifically indicate a category (category) of a terminal, and/or information about a low-cost technology supported by the terminal, and/or information about a service supported by the terminal. The base station and/or the MME may determine, by using the terminal information of the UE, a category of a terminal, and low-cost information and service information that are used by the terminal. If the base station does not support the UE at all, the base station may not send the second paging message. If the base station does not support the UE at all, the MME may not send the first paging message.

It should be noted that the low-cost technology in the foregoing described terminal information may be one or more of bandwidth reduction, peak data rate reduction, a single receive antenna, complexity reduction, half-duplex, transmission mode reduction, or transmit power reduction of user equipment. A service type may be a machine type service, and/or a low-delay service, and/or a low-power service.

It can be learned from the foregoing embodiment description about the present application that, because a base station sends a paging message to UE according to coverage enhancement information of the UE, it is ensured that the UE can normally receive the paging message sent by the base station, and the UE can be effectively covered. Further, the UE may receive, in a proper manner according to coverage enhancement information of the base station and the coverage enhancement information of the UE, the paging message sent by the base station. Therefore, inconsistency in paging message sending and receiving between the base station and the UE is avoided, system resources are saved, and resource utilization efficiency is improved.

To better understand and implement the foregoing solutions in the embodiments of the present application, the following uses a corresponding application scenario as an example for detailed description.

Figure 4:
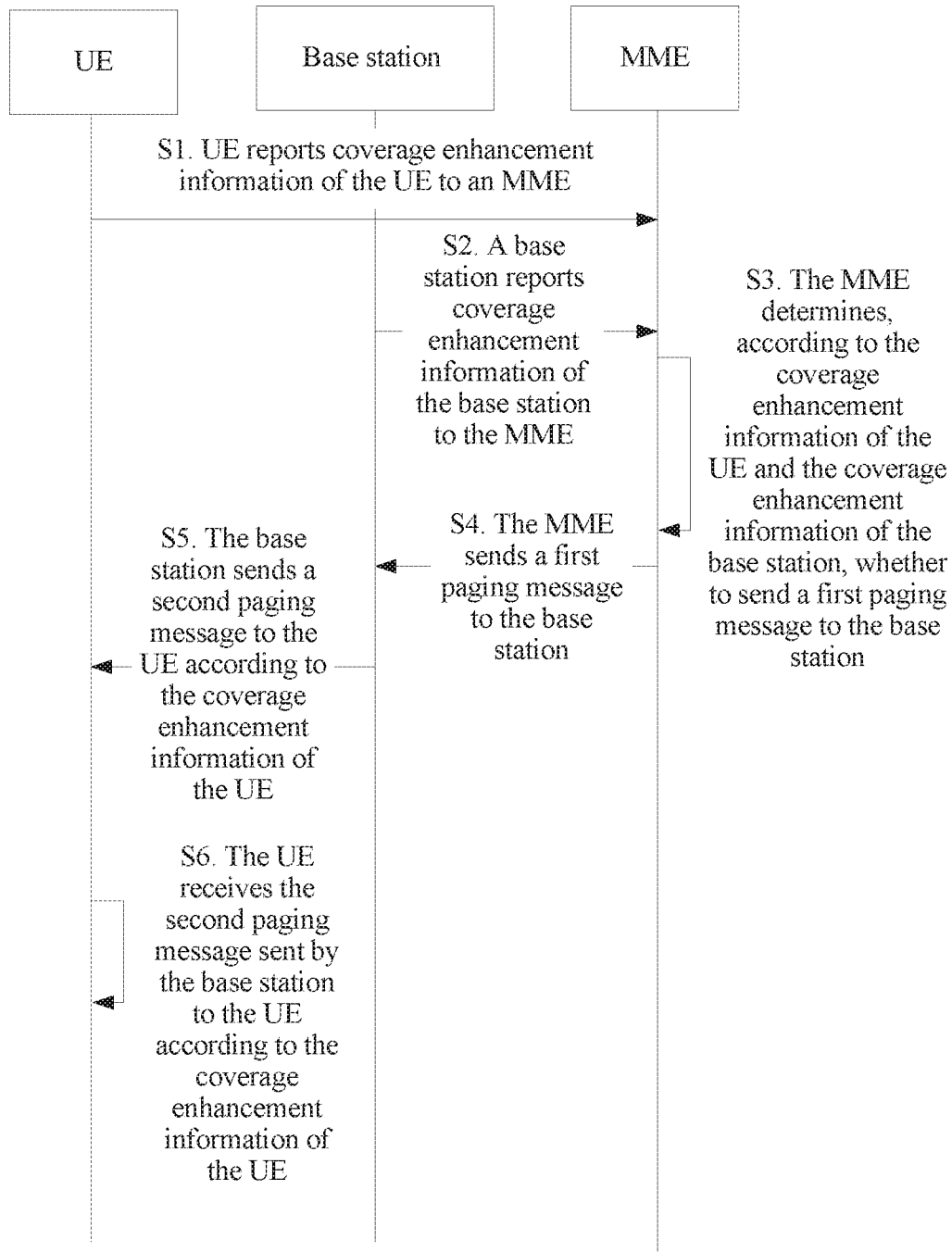
FIG. 4 is a schematic diagram of a process of interaction between an MME, UE, and a base station according to an embodiment of the present application.

Referring to FIG. 4, FIG. 4 is a schematic diagram of a process of interaction between an MME, UE, and a base station in an embodiment of the present application. The process may specifically include the following steps.

At step S1, the UE reports coverage enhancement information of the UE to the MME.

For a specific implementation manner, refer to the foregoing description in the embodiment corresponding to FIG. 3.

At step S2, the base station reports coverage enhancement information of the base station to the MME.

For a specific implementation manner, refer to the foregoing description in the embodiment corresponding to FIG. 1.

At step S3, the MME determines, according to the coverage enhancement information of the UE and the coverage enhancement information of the base station, whether to send a first paging message to the base station.

For a specific implementation manner, refer to the foregoing description in the embodiment corresponding to FIG. 2.

At step S4, the MME sends a first paging message to the base station, where the first paging message includes the coverage enhancement information of the UE.

At step S5, the base station sends a second paging message to the UE according to the coverage enhancement information of the UE.

For a specific implementation manner, refer to the foregoing description in the embodiment corresponding to FIG. 1.

At step S6, the UE receives the second paging message sent by the base station to the UE according to the coverage enhancement information of the UE.

For a specific implementation manner, refer to the foregoing description in the embodiment corresponding to FIG. 3.

From the description that is about the present application and is given in the foregoing embodiment by using an example, it can be learned that an MME sends a first paging message to a base station, and the first paging message includes coverage enhancement information of UE to be paged by using the first paging message. The base station may obtain the coverage enhancement information of the UE from the first paging message sent by the MME. The base station may send a second paging message to the UE according to the foregoing coverage enhancement information of the UE. Because the base station sends the second paging message to the UE according to the coverage enhancement information of the UE, it is ensured that the UE can normally receive the second paging message sent by the base station, and the UE can be effectively covered.

It should be noted that, to make the description brief, the foregoing method embodiments are expressed as a series of actions. However, persons skilled in the art should appreciate that the present application is not limited to the described action sequence, because according to the present application, some steps may be performed in other sequences or performed simultaneously. In addition, persons skilled in the art should also appreciate that all the embodiments described in the specification are examples of the embodiments, and the related actions and modules are not necessarily mandatory to the present application.

To better implement the foregoing solutions in the embodiments of the present application, the following further provides a related apparatus used to implement the foregoing solutions.

Referring to FIG. 5-a, a base station 500 provided in an embodiment of the present application may include a receiving module 501 and a sending module 502.

The receiving module 501 is configured to receive a first paging message sent by a mobility management entity MME, where the first paging message includes coverage enhancement information of user equipment UE to be paged by using the first paging message.

The sending module 502 is configured to send a second paging message to the UE according to the coverage enhancement information of the UE.

In some embodiments of the present application, the coverage enhancement information of the UE indicates that the UE requires coverage enhancement. The sending module 502 is specifically configured to: when the base station determines that the base station supports coverage enhancement, send the second paging message to the UE in a coverage enhancement manner supported by the base station; or when the base station determines that the base station does not support coverage enhancement, send the second paging message to the UE in a non-coverage enhancement manner.

In some embodiments of the present application, the sending module 502 is specifically configured to send the second paging message to the UE according to a highest coverage enhancement level or a lowest coverage enhancement level, where the highest coverage enhancement level or the lowest coverage enhancement level is supported by the base station.

In some embodiments of the present application, the coverage enhancement information of the UE indicates a coverage enhancement level about the UE. The sending module 502 is specifically configured to: when a highest coverage enhancement level supported by the base station is higher than or equal to the coverage enhancement level about the UE, send the second paging message to the UE according to the coverage enhancement level about the UE; or when a highest coverage enhancement level supported by the base station is lower than the coverage enhancement level about the UE, send the second paging message to the UE according to the highest coverage enhancement level supported by the base station; or when the base station determines that the base station does not support coverage enhancement, send the second paging message to the UE in a non-coverage enhancement manner.

In some embodiments of the present application, the coverage enhancement information of the UE indicates a coverage enhancement level about the UE. Referring to FIG. 5-b, the base station 500 further includes: a processing module 503, configured to: when a difference between a highest coverage enhancement level supported by the base station and the coverage enhancement level about the UE does not meet a preset first condition, skip sending the second paging message to the UE; or the sending module 502 is specifically configured to: when a difference between a highest coverage enhancement level supported by the base station and the coverage enhancement level about the UE meets a preset first condition, send the second paging message to the UE according to the coverage enhancement information of the UE.

In some embodiments of the present application, the receiving module 501 is further configured to receive the coverage enhancement information of the UE that is reported by the UE; or the receiving module 501 is further configured to receive the coverage enhancement information of the UE, and the sending module 502 is further configured to report the coverage enhancement information of the UE to the MME.

In some embodiments of the present application, the sending module 502 is further configured to send coverage enhancement information of the base station to the MME.

In some embodiments of the present application, the coverage enhancement information of the UE includes at least one or more types of the following content: the UE requires coverage enhancement, the UE does not require coverage enhancement, the coverage enhancement level about the UE, a repetition level about the UE, a repetition count about the UE, a quantity of retransmissions about the UE, a spreading factor about the UE, a narrowband bandwidth about the UE, a time interval bundle size about the UE, a number of continuous attempts about the UE, or a power spectrum density boosting multiple about the UE.

In some embodiments of the present application, the coverage enhancement information of the base station includes at least one or more types of the following content: the base station supports coverage enhancement, the base station does not support coverage enhancement, a coverage enhancement level supported by the base station, the highest coverage enhancement level supported by the base station, a quantity of coverage enhancement levels supported by the base station, an index of a coverage enhancement level supported by the base station, a repetition level supported by the base station, a highest repetition level supported by the base station, a repetition count supported by the base station, a maximum repetition count supported by the base station, a quantity of retransmissions that is supported by the base station, a maximum quantity of retransmissions that is supported by the base station, a maximum spreading factor supported by the base station, a minimum narrowband supported by the base station, a maximum time interval bundle supported by the base station, or a maximum power spectrum density boosting multiple supported by the base station.

It can be learned from the foregoing embodiment description about the present application that, an MME sends a first paging message to a base station, and the first paging message includes coverage enhancement information of UE to be paged by using the first paging message. The base station may obtain the coverage enhancement information of the UE from the first paging message sent by the MME, and the base station may send a second paging message to the UE according to the foregoing coverage enhancement information of the UE. Because the base station sends the second paging message to the UE according to the coverage enhancement information of the UE, it is ensured that the UE can normally receive the second paging message sent by the base station, and the UE can be effectively covered.

Referring to FIG. 6-a, an MME 600 provided in an embodiment of the present application may include an obtaining module 601 and a determining module 602.

The obtaining module 601 is configured to obtain coverage enhancement information of user equipment UE.

The determining module 602 is configured to determine, according to the coverage enhancement information of the UE, whether to send a first paging message to a base station, where the base station is located in a tracking area in which the UE is located.

In some embodiments of the present application, the determining module 602 is specifically configured to: when the coverage enhancement information of the UE indicates that the UE requires coverage enhancement, determine to send a first paging message to the base station, where the first paging message includes the coverage enhancement information of the UE.

In some embodiments of the present application, referring to FIG. 6-b, the MME 600 further includes: a sending module 603, configured to send a first paging message to the base station, where the first paging message includes the coverage enhancement information of the UE.

In some embodiments of the present application, referring to FIG. 6-c, in comparison with the MME shown in FIG. 6-a, the MME 600 further includes: a receiving module 604, configured to receive coverage enhancement information of the base station that is sent by the base station.

In some embodiments of the present application, the determining module 602 is specifically configured to: when the coverage enhancement information of the UE indicates that the UE requires coverage enhancement and the coverage enhancement information of the base station indicates that the base station supports coverage enhancement, determine to send a first paging message to the base station, where the first paging message includes the coverage enhancement information of the UE.

A sending module 603 is configured to: after the determining module determines to send a first paging message to the base station, send a first paging message to the base station, where the first paging message includes the coverage enhancement information of the UE.

In some embodiments of the present application, the determining module 602 is specifically configured to: when the coverage enhancement information of the UE indicates that the UE requires coverage enhancement and the coverage enhancement information of the base station indicates that the base station does not support coverage enhancement, determine not to send a first paging message to the base station.

In some embodiments of the present application, the determining module 602 is specifically configured to: when the coverage enhancement information of the UE indicates that the UE requires coverage enhancement and the coverage enhancement information of the base station indicates that the base station does not support coverage enhancement, determine to send a first paging message to the base station, where the first paging message does not include the coverage enhancement information of the UE.

In some embodiments of the present application, the determining module 602 is specifically configured to: when a difference between a highest coverage enhancement level supported by the base station and a coverage enhancement level about the UE meets a preset first condition, determine to send a first paging message to the base station, where the first paging message includes the coverage enhancement information of the UE.

A sending module 603 is configured to send a first paging message to the base station.

In some embodiments of the present application, the determining module 602 is specifically configured to: when a difference between a highest coverage enhancement level supported by the base station and a coverage enhancement level about the UE does not meet a preset first condition, determine not to send a first paging message to the base station.

In some embodiments of the present application, the coverage enhancement information of the UE includes at least one or more types of the following content: the UE requires coverage enhancement, the UE does not require coverage enhancement, the coverage enhancement level about the UE, a repetition level about the UE, a repetition count about the UE, a quantity of retransmissions about the UE, a spreading factor about the UE, a narrowband bandwidth about the UE, a time interval bundle size about the UE, a number of continuous attempts about the UE, or a power spectrum density boosting multiple about the UE.

In some embodiments of the present application, the coverage enhancement information of the base station includes at least one or more types of the following content: the base station supports coverage enhancement, the base station does not support coverage enhancement, a coverage enhancement level supported by the base station, the highest coverage enhancement level supported by the base station, a quantity of coverage enhancement levels supported by the base station, an index of a coverage enhancement level supported by the base station, a repetition level supported by the base station, a highest repetition level supported by the base station, a repetition count supported by the base station, a maximum repetition count supported by the base station, a quantity of retransmissions that is supported by the base station, a maximum quantity of retransmissions that is supported by the base station, a maximum spreading factor supported by the base station, a minimum narrowband supported by the base station, a maximum time interval bundle supported by the base station, or a maximum power spectrum density boosting multiple supported by the base station.

It can be learned from the foregoing embodiment description about the method in the present application that, an MME may determine, according to coverage enhancement information of UE and coverage enhancement information of a base station, whether to send a first paging message to the base station. The MME may determine, according to a coverage enhancement support degree of the base station (for example, that the base station does not support coverage enhancement, that the base station supports coverage enhancement, or a highest coverage enhancement level supported by the base station), whether to send a first paging message, so that the base station can use a proper transmission manner (for example, non-coverage enhancement transmission or a coverage enhancement level used in coverage enhancement transmission). Therefore, operation behavior of each entity in a system is identified, overheads of signaling between the base station and the MME are reduced, unnecessary PAGING message transmission between the MME and the base station is avoided, system resources are saved, resource utilization efficiency is improved, and system resource utilization and paging message transmission are optimized.

Referring to FIG. 7-a, UE 700 provided in an embodiment of the present application may include a sending module 701 and a receiving module 702.

The sending module 701 is configured to report coverage enhancement information of the UE to a base station or a mobility management entity MME.

The receiving module 702 is configured to receive a paging message sent by the base station to the UE according to the coverage enhancement information of the UE.

In some embodiments of the present application, referring to FIG. 7-b, the UE 700 further includes: an obtaining module 703, configured to obtain coverage enhancement information of the base station from a broadcast message of the base station.

The receiving module 702 is specifically configured to: when a highest coverage enhancement level supported by the base station is higher than or equal to a coverage enhancement level about the UE, receive, according to the coverage enhancement level about the UE, the paging message sent by the base station; or when a highest coverage enhancement level supported by the base station is lower than a coverage enhancement level about the UE, receive, according to the highest coverage enhancement level supported by the base station, the paging message sent by the base station; or when the base station does not support coverage enhancement, receive, in a non-coverage enhancement manner, the paging message sent by the base station.

In some embodiments of the present application, referring to FIG. 7-c, in comparison with the UE shown in FIG. 7-a, the UE 700 further includes an obtaining module 703 and a processing module 704.

The obtaining module 703 is configured to obtain coverage enhancement information of the base station from a broadcast message of the base station.

The processing module 704 is configured to: when a difference between a highest coverage enhancement level supported by the base station and a coverage enhancement level about the UE does not meet a preset first condition, skip receiving the paging message sent by the base station; or the receiving module 702 is specifically configured to: when a difference between a highest coverage enhancement level supported by the base station and a coverage enhancement level about the UE meets a preset first condition, receive the paging message sent by the base station.

In some embodiments of the present application, referring to FIG. 7-d, in comparison with the UE shown in FIG. 7-a, the UE 700 further includes: a determining module 705, configured to: before the sending module 701 reports the coverage enhancement information of the UE to the base station or the mobility management entity MME, determine whether the UE requires coverage enhancement; and if the UE does not require coverage enhancement, add, to the coverage enhancement information of the UE, information that the UE does not require coverage enhancement; or if the UE requires coverage enhancement, add, to the coverage enhancement information of the UE, information that the UE requires coverage enhancement.

In some embodiments of the present application, the determining module 705 is specifically configured to: determine whether reference signal received power RSRP of the UE is greater than a first threshold; and if the RSRP is greater than or equal to the first threshold, determine that the UE does not require coverage enhancement; or if the RSRP is less than the first threshold, determine that the UE requires coverage enhancement; or determine whether a path loss of the UE is less than a second threshold; and if the path loss is less than the second threshold, determine that the UE does not require coverage enhancement; or if the path loss is greater than or equal to the second threshold, determine that the UE requires coverage enhancement; or determine whether detection performed by the UE on the physical random access channel meets a preset second condition; and if the detection on the physical random access channel meets the preset second condition, determine that the UE does not require coverage enhancement; or if the detection on the physical random access channel does not meet the preset second condition, determine that the UE requires coverage enhancement; or determine whether a random access process completed by the UE meets a preset third condition; and if the random access process completed by the UE meets the preset third condition, determine that the UE does not require coverage enhancement; or if the random access process completed by the UE does not meet the preset third condition, determine that the UE requires coverage enhancement.

In some embodiments of the present application, the coverage enhancement information of the UE includes at least one or more types of the following content: the UE requires coverage enhancement, the UE does not require coverage enhancement, the coverage enhancement level about the UE, a repetition level about the UE, a repetition count about the UE, a quantity of retransmissions about the UE, a spreading factor about the UE, a narrowband bandwidth about the UE, a time interval bundle size about the UE, a number of continuous attempts about the UE, or a power spectrum density boosting multiple about the UE.

It can be learned from the foregoing embodiment description about the present application that, because a base station sends a paging message to UE according to coverage enhancement information of the UE, it is ensured that the UE can normally receive the paging message sent by the base station, and the UE can be effectively covered. Further, the UE may receive, in a proper manner according to coverage enhancement information of the base station and the coverage enhancement information of the UE, the paging message sent by the base station. Therefore, inconsistency in paging message sending and receiving between the base station and the UE is avoided, system resources are saved, and resource utilization efficiency is improved.

An embodiment of the present application further provides a computer storage medium. The computer storage medium stores a program. The program executes some or all of steps described in the foregoing method embodiments.

Figure 8:
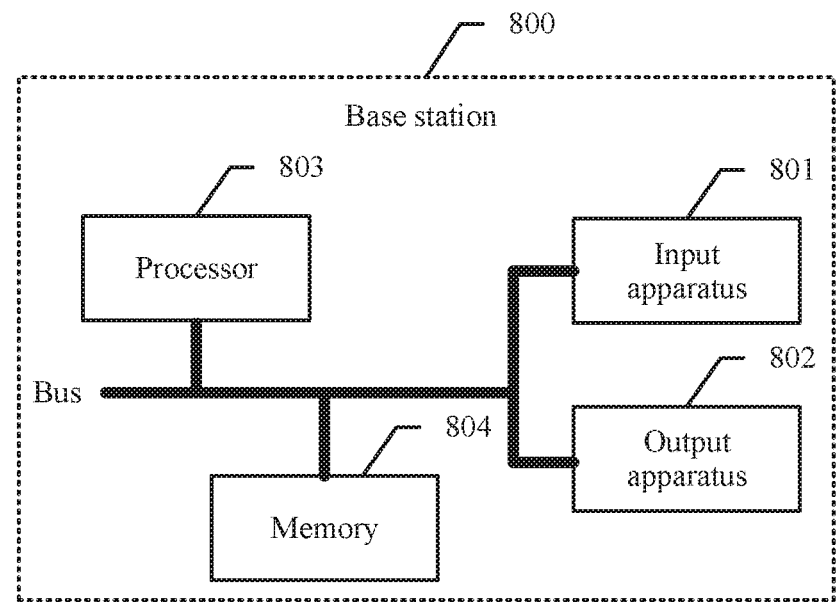
FIG. 8 is a schematic structural composition diagram of another base station according to an embodiment of the present application.

The following describes another base station provided in an embodiment of the present application. Referring to FIG. 8, a base station 800 includes: an input apparatus 801, an output apparatus 802, a processor 803, and a memory 804 (there may be one or more processors 803 in the base station 800, and one processor is used as an example in FIG. 8). In some embodiments of the present application, the input apparatus 801, the output apparatus 802, the processor 803, and the memory 804 may be connected by using a bus or by another means. In FIG. 8, a bus connection is used as an example.

The processor 803 is configured to perform the following steps: receiving, by using the input apparatus 801, a first paging message sent by a mobility management entity MME, where the first paging message includes coverage enhancement information of user equipment UE to be paged by using the first paging message; and sending a second paging message to the UE according to the coverage enhancement information of the UE by using the output apparatus 802.

In some embodiments of the present application, the coverage enhancement information of the UE that is stored in the memory 804 indicates that the UE requires coverage enhancement.

The processor 803 is specifically configured to perform the following step: when the base station determines that the base station supports coverage enhancement, sending the second paging message to the UE in a coverage enhancement manner supported by the base station and by using the output apparatus 802; or when the base station determines that the base station does not support coverage enhancement, sending the second paging message to the UE in a non-coverage enhancement manner by using the output apparatus 802.

In some embodiments of the present application, the processor 803 is specifically configured to perform the following step: sending the second paging message to the UE according to a highest coverage enhancement level or a lowest coverage enhancement level, where the highest coverage enhancement level or the lowest coverage enhancement level is supported by the base station and by using the output apparatus 802.

In some embodiments of the present application, the coverage enhancement information of the UE that is stored in the memory 804 indicates a coverage enhancement level about the UE.

The processor 803 is specifically configured to perform the following step: when a highest coverage enhancement level supported by the base station is higher than or equal to the coverage enhancement level about the UE, sending the second paging message to the UE according to the coverage enhancement level about the UE by using the output apparatus 802; or when a highest coverage enhancement level supported by the base station is lower than the coverage enhancement level about the UE, sending the second paging message to the UE according to the highest coverage enhancement level supported by the base station and by using the output apparatus 802; or when the base station determines that the base station does not support coverage enhancement, sending the second paging message to the UE in a non-coverage enhancement manner by using the output apparatus 802.

In some embodiments of the present application, the coverage enhancement information of the UE that is stored in the memory 804 indicates a coverage enhancement level about the UE. The processor 803 is further configured to perform the following step: after receiving, by using the input apparatus 801, the first paging message sent by the mobility management entity MME, when a difference between a highest coverage enhancement level supported by the base station and the coverage enhancement level about the UE does not meet a preset first condition, skipping sending the second paging message to the UE; or when a difference between a highest coverage enhancement level supported by the base station and the coverage enhancement level about the UE meets a preset first condition, sending the second paging message to the UE according to the coverage enhancement information of the UE by using the output apparatus 802.

In some embodiments of the present application, the processor 803 is further configured to perform the following step: before sending the second paging message to the UE according to the coverage enhancement information of the UE, receiving, by using the input apparatus 801, the coverage enhancement information of the UE that is reported by the UE; or receiving the coverage enhancement information of the UE by using the input apparatus 801, and reporting the coverage enhancement information of the UE to the MME by using the output apparatus 802.

In some embodiments of the present application, the processor 803 is further configured to perform the following step: before receiving the first paging message sent by the mobility management entity MME, sending coverage enhancement information of the base station to the MME by using the input apparatus 801.

In some embodiments of the present application, the coverage enhancement information of the UE that is stored in the memory 804 includes at least one or more types of the following content: the UE requires coverage enhancement, the UE does not require coverage enhancement, the coverage enhancement level about the UE, a repetition level about the UE, a repetition count about the UE, a quantity of retransmissions about the UE, a spreading factor about the UE, a narrowband bandwidth about the UE, a time interval bundle size about the UE, a number of continuous attempts about the UE, or a power spectrum density boosting multiple about the UE.

In some embodiments of the present application, the coverage enhancement information of the base station that is stored in the memory 804 includes at least one or more types of the following content: the base station supports coverage enhancement, the base station does not support coverage enhancement, a coverage enhancement level supported by the base station, the highest coverage enhancement level supported by the base station, a quantity of coverage enhancement levels supported by the base station, an index of a coverage enhancement level supported by the base station, a repetition level supported by the base station, a highest repetition level supported by the base station, a repetition count supported by the base station, a maximum repetition count supported by the base station, a quantity of retransmissions that is supported by the base station, a maximum quantity of retransmissions that is supported by the base station, a maximum spreading factor supported by the base station, a minimum narrowband supported by the base station, a maximum time interval bundle supported by the base station, or a maximum power spectrum density boosting multiple supported by the base station.

It can be learned from the foregoing embodiment description about the present application that, an MME sends a first paging message to a base station, and the first paging message includes coverage enhancement information of UE to be paged by using the first paging message. The base station may obtain the coverage enhancement information of the UE from the first paging message sent by the MME, and the base station may send a second paging message to the UE according to the foregoing coverage enhancement information of the UE. Because the base station sends the second paging message to the UE according to the coverage enhancement information of the UE, it is ensured that the UE can normally receive the second paging message sent by the base station, and the UE can be effectively covered.

Figure 9:
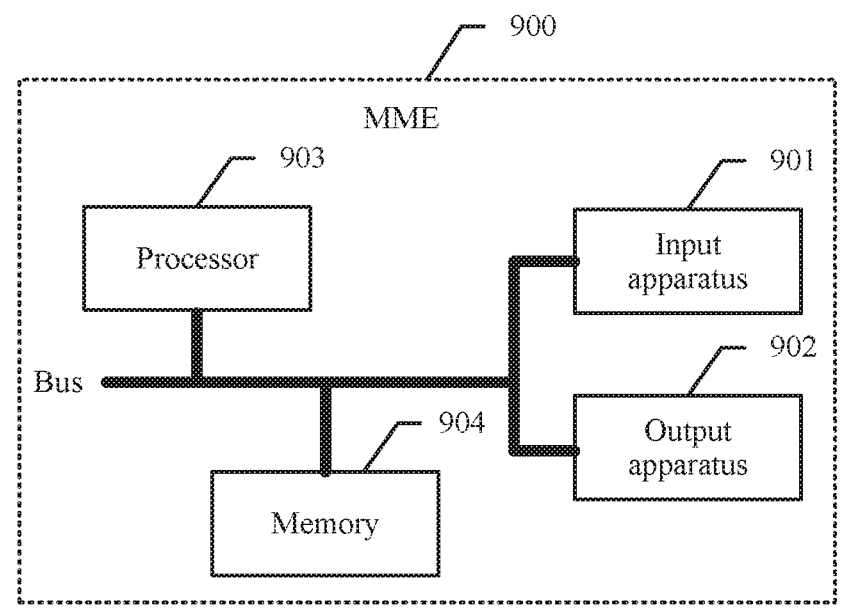
FIG. 9 is a schematic structural composition diagram of another MME according to an embodiment of the present application.

The following describes another MME provided in an embodiment of the present application. Referring to FIG. 9, an MME 900 includes: an input apparatus 901, an output apparatus 902, a processor 903, and a memory 904 (there may be one or more processors 903 in the MME 900, and one processor is used as an example in FIG. 9). In some embodiments of the present application, the input apparatus 901, the output apparatus 902, the processor 903, and the memory 904 may be connected by using a bus or by another means. In FIG. 9, a bus connection is used as an example.

The processor 903 is configured to perform the following steps: obtaining coverage enhancement information of user equipment UE; and determining, according to the coverage enhancement information of the UE, whether to send a first paging message to a base station, where the base station is located in a tracking area in which the UE is located.

In some embodiments of the present application, when the coverage enhancement information of the UE that is stored in the memory 904 indicates that the UE requires coverage enhancement, the processor 903 is specifically configured to perform the following step: determining to send a first paging message to the base station, where the first paging message includes the coverage enhancement information of the UE.

The processor 903 is further configured to perform the following step: after determining to send a first paging message to the base station, sending a first paging message to the base station by using the output apparatus 902, where the first paging message includes the coverage enhancement information of the UE.

In some embodiments of the present application, the processor 903 is further configured to perform the following step: before determining, according to the coverage enhancement information, whether to send a first paging message to the base station, receiving, by using the input apparatus 901, coverage enhancement information of the base station that is sent by the base station.

In some embodiments of the present application, the processor 903 is specifically configured to perform the following step: when the coverage enhancement information of the UE indicates that the UE requires coverage enhancement and the coverage enhancement information of the base station indicates that the base station supports coverage enhancement, determining to send a first paging message to the base station, where the first paging message includes the coverage enhancement information of the UE.

The processor 903 is further configured to perform the following step: after determining to send a first paging message to the base station, sending a first paging message to the base station by using the output apparatus 902, where the first paging message includes the coverage enhancement information of the UE.

In some embodiments of the present application, the processor 903 is specifically configured to perform the following step: when the coverage enhancement information of the UE indicates that the UE requires coverage enhancement and the coverage enhancement information of the base station indicates that the base station does not support coverage enhancement, determining not to send a first paging message to the base station.

In some embodiments of the present application, the processor 903 is specifically configured to perform the following step: when the coverage enhancement information of the UE indicates that the UE requires coverage enhancement and the coverage enhancement information of the base station indicates that the base station does not support coverage enhancement, determining to send a first paging message to the base station, where the first paging message does not include the coverage enhancement information of the UE.

In some embodiments of the present application, the processor 903 is specifically configured to perform the following step: when a difference between a highest coverage enhancement level supported by the base station and a coverage enhancement level about the UE meets a preset first condition, determining to send a first paging message to the base station, where the first paging message includes the coverage enhancement information of the UE.

The processor 903 is further configured to perform the following step: after determining to send a first paging message to the base station, sending a first paging message to the base station by the output apparatus 902.

In some embodiments of the present application, the processor 903 is specifically configured to perform the following step: when a difference between a highest coverage enhancement level supported by the base station and a coverage enhancement level about the UE does not meet a preset first condition, determining not to send a first paging message to the base station.

In some embodiments of the present application, the coverage enhancement information of the UE that is stored in the memory 904 includes at least one or more types of the following content: the UE requires coverage enhancement, the UE does not require coverage enhancement, the coverage enhancement level about the UE, a repetition level about the UE, a repetition count about the UE, a quantity of retransmissions about the UE, a spreading factor about the UE, a narrowband bandwidth about the UE, a time interval bundle size about the UE, a number of continuous attempts about the UE, or a power spectrum density boosting multiple about the UE.

In some embodiments of the present application, the coverage enhancement information of the base station that is stored in the memory 904 includes at least one or more types of the following content: the base station supports coverage enhancement, the base station does not support coverage enhancement, a coverage enhancement level supported by the base station, the highest coverage enhancement level supported by the base station, a quantity of coverage enhancement levels supported by the base station, an index of a coverage enhancement level supported by the base station, a repetition level supported by the base station, a highest repetition level supported by the base station, a repetition count supported by the base station, a maximum repetition count supported by the base station, a quantity of retransmissions that is supported by the base station, a maximum quantity of retransmissions that is supported by the base station, a maximum spreading factor supported by the base station, a minimum narrowband supported by the base station, a maximum time interval bundle supported by the base station, or a maximum power spectrum density boosting multiple supported by the base station.

It can be learned from the foregoing embodiment description about the method in the present application that, an MME may determine, according to coverage enhancement information of UE and coverage enhancement information of a base station, whether to send a first paging message to the base station. The MME may determine, according to a coverage enhancement support degree of the base station (for example, that the base station does not support coverage enhancement, that the base station supports coverage enhancement, or a highest coverage enhancement level supported by the base station), whether to send a first paging message, so that the base station can use a proper transmission manner (for example, non-coverage enhancement transmission or a coverage enhancement level used in coverage enhancement transmission). Therefore, operation behavior of each entity in a system is identified, overheads of signaling between the base station and the MME are reduced, unnecessary PAGING message transmission between the MME and the base station is avoided, system resources are saved, resource utilization efficiency is improved, and system resource utilization and paging message transmission are optimized.

Figure 10:
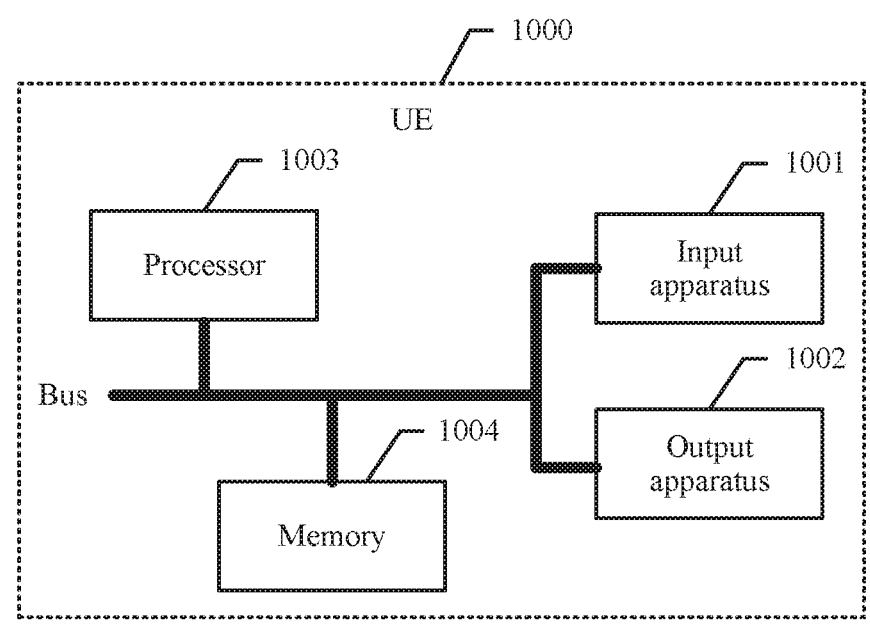
FIG. 10 is a schematic structural composition diagram of another UE according to an embodiment of the present application.

The following describes another UE provided in an embodiment of the present application. Referring to FIG. 10, UE 1000 includes: an input apparatus 1001, an output apparatus 1002, a processor 1003, and a memory 1004 (there may be one or more processors 1003 in the UE 1000, and one processor is used as an example in FIG. 10). In some embodiments of the present application, the input apparatus 1001, the output apparatus 1002, the processor 1003, and the memory 1004 may be connected by using a bus or by another means. In FIG. 10, a bus connection is used as an example.

The processor 1003 is configured to perform the following steps: reporting coverage enhancement information of the UE to a base station or a mobility management entity MME by using the output apparatus 1002; and receiving, by using the input apparatus 1001, a paging message sent by the base station to the UE according to the coverage enhancement information of the UE.

In some embodiments of the present application, the processor 1003 is further configured to perform the following step: before receiving the paging message sent by the base station to the UE according to the coverage enhancement information of the UE, obtaining coverage enhancement information of the base station from a broadcast message of the base station.

The processor 1003 is specifically configured to perform the following step: when a highest coverage enhancement level supported by the base station is higher than or equal to a coverage enhancement level about the UE, receiving, according to the coverage enhancement level about the UE by using the input apparatus 1001, the paging message sent by the base station; or when a highest coverage enhancement level supported by the base station is lower than a coverage enhancement level about the UE, receiving, according to the highest coverage enhancement level supported by the base station and by using the input apparatus 1001, the paging message sent by the base station; or when the base station does not support coverage enhancement, receiving, in a non-coverage enhancement manner by using the input apparatus 1001, the paging message sent by the base station.

In some embodiments of the present application, the processor 1003 is further configured to perform the following steps: obtaining coverage enhancement information of the base station from a broadcast message of the base station; and when a difference between a highest coverage enhancement level supported by the base station and a coverage enhancement level about the UE does not meet a preset first condition, skipping receiving the paging message sent by the base station; or the processor 1003 is specifically configured to perform the following step: when a difference between a highest coverage enhancement level supported by the base station and a coverage enhancement level about the UE meets a preset first condition, receiving, by using the input apparatus 1001, the paging message sent by the base station.

In some embodiments of the present application, the processor 1003 is further configured to perform the following step: before reporting the coverage enhancement information of the UE to the base station or the mobility management entity MME, determining whether the UE requires coverage enhancement; and if the UE does not require coverage enhancement, adding to the coverage enhancement information of the UE, information that the UE does not require coverage enhancement; or if the UE requires coverage enhancement, adding to the coverage enhancement information of the UE, information that the UE requires coverage enhancement.

In some embodiments of the present application, the processor 1003 is specifically configured to perform the following step: determining whether reference signal received power RSRP of the UE is greater than a first threshold; and if the RSRP is greater than or equal to the first threshold, determining that the UE does not require coverage enhancement; or if the RSRP is less than the first threshold, determining that the UE requires coverage enhancement; or determining whether a path loss of the UE is less than a second threshold; and if the path loss is less than the second threshold, determining that the UE does not require coverage enhancement; or if the path loss is greater than or equal to the second threshold, determining that the UE requires coverage enhancement; or determining whether detection performed by the UE on the physical random access channel meets a preset second condition; and if the detection on the physical random access channel meets the preset second condition, determining that the UE does not require coverage enhancement; or if the detection on the physical random access channel does not meet the preset second condition, determining that the UE requires coverage enhancement; or determining whether a random access process completed by the UE meets a preset third condition; and if the random access process completed by the UE meets the preset third condition, determining that the UE does not require coverage enhancement; or if the random access process completed by the UE does not meet the preset third condition, determining that the UE requires coverage enhancement.

In some embodiments of the present application, the coverage enhancement information of the UE that is stored in the memory 1004 includes at least one or more types of the following content: the UE requires coverage enhancement, the UE does not require coverage enhancement, the coverage enhancement level about the UE, a repetition level about the UE, a repetition count about the UE, a quantity of retransmissions about the UE, a spreading factor about the UE, a narrowband bandwidth about the UE, a time interval bundle size about the UE, a number of continuous attempts about the UE, or a power spectrum density boosting multiple about the UE.

It can be learned from the foregoing embodiment description about the present application that, because a base station sends a paging message to UE according to coverage enhancement information of the UE, it is ensured that the UE can normally receive the paging message sent by the base station, and the UE can be effectively covered. Further, the UE may receive, in a proper manner according to coverage enhancement information of the base station and the coverage enhancement information of the UE, the paging message sent by the base station. Therefore, inconsistency in paging message sending and receiving between the base station and the UE is avoided, system resources are saved, and resource utilization efficiency is improved.

In addition, it should be noted that the described apparatus embodiments are merely examples. The units described as separate parts may or may not be physically separate. Parts displayed as units may or may not be physical units, that is, may be located in one position, or may be distributed on multiple network units. Some or all of modules may be selected according to actual needs to achieve the objectives of the solutions of the embodiments. In addition, in the accompanying drawings of the apparatus embodiments provided in the present application, connection relationships between modules indicate that the modules have communication connections with each other. This may be specifically implemented as one or more communications buses or signal cables. Persons of ordinary skill in the art may understand and implement the embodiments of the present application without creative efforts.

Based on the description of the foregoing implementation manners, persons skilled in the art may clearly understand that the present application may be implemented by using software in addition to necessary universal hardware; or certainly, the present application may be implemented by using dedicated hardware that includes a dedicated integrated circuit, a dedicated Central Processing Unit (CPU), a dedicated memory, a dedicated component, and the like. Generally, any function that can be completed by a computer program can be easily implemented by using corresponding hardware. In addition, a specific hardware structure used to achieve a same function may be in various forms, for example, in a form of an analog circuit, a digital circuit, or a dedicated circuit. However, as for the present application, software program implementation is a better implementation manner in most cases. Based on such an understanding, the technical solutions in the present application essentially or the part contributing to the prior art may be implemented in a form of a software product. The computer software product is stored in a readable storage medium, such as a floppy disk, a Universal Serial Bus (USB) flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods described in the embodiments of the present application.

In conclusion, the foregoing embodiments are merely intended for describing the technical solutions in the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof. However, these modifications and replacements are not intended to make the essence of the corresponding technical solutions depart from the spirit and scope of the technical solutions of the embodiments of the present application.

What is claimed is:

1. An apparatus for initiating a paging to a terminal device, the apparatus comprising:
   a processor; and
   a non-transitory memory storing programming for execution by the processor, the programming includes instructions for:
   receiving coverage enhancement information of a base station, wherein the coverage enhancement information of the base station indicates that the base station supports coverage enhancement;
   determining a number of continuous attempts about the terminal device; and
   sending a first paging message to the base station, wherein the first paging message comprises the number of continuous attempts on the terminal device, wherein the sending the first paging message to the base station causes the base station to:
   avoid sending, in response to the base station determining that the base station does not support the terminal device, a second paging message to the terminal device; and
   send, in response to the base station determining that the base station supports the terminal device, the second paging message to the terminal device by using a coverage enhancement measure, wherein the coverage enhancement measure is determined by the base station, in response to the base station determining that the base station supports coverage enhancement, to be a coverage enhancement selected according to the highest coverage enhancement level supported by the base station and further according to a coverage enhancement level needed by the UE and that is selected according to a number of continuous attempts about the terminal device, and wherein the coverage enhancement measure is determined, by the base station, in response to the base station determining that the base station does not support coverage enhancement, to be transmission without coverage enhancement;
   wherein the base station is located in a tracking area in which the terminal device is located.

2. The apparatus according to claim 1, wherein the first paging message further comprises a repetition count about the terminal device.

3. The apparatus according to claim 2, wherein the repetition count about the terminal device comprises a repetition count for a control channel provided by the apparatus to the base station.

4. The apparatus according to claim 1, wherein the paging message further comprises an identity index value of the terminal device or a paging identity of the terminal device.

5. A base station comprising:
   a processor; and
   a non-transitory memory storing programming for execution by the processor, the programming includes instructions for:
   receiving a first paging message, wherein the first paging message comprises a number of continuous attempts about a user equipment (UE);
   determining, according to supported-terminal information of the base station, whether the base station supports the UE;
   determining whether the base station supports coverage enhancement;
   determining, in response to determining that the base station supports coverage enhancement, a highest level of coverage enhancement supported by the base station;
   determining, in response to determining that the base station supports coverage enhancement, a coverage enhancement measure to be a coverage enhancement selected according to the highest coverage enhancement level supported by the base station and further according to a coverage enhancement level needed by the UE and that is selected according to the number of continuous attempts about the UE;
   determining, in response to determining that the base station does not support coverage enhancement, the coverage enhancement measure to be transmission without coverage enhancement;
   sending, in response to determining that the base station supports the UE, a second paging message to the UE by using the coverage enhancement measure; and
   avoiding sending, in response to determining that the base station does not support the UE, the second paging message to the UE.

6. The base station according to claim 5, wherein sending the second paging message to the UE comprises sending the second paging message to the UE using a highest coverage enhancement level or a lowest coverage enhancement level supported by the base station.

7. The base station according to claim 5,
wherein the first paging message further comprises a coverage enhancement level of the UE, and
wherein the instructions for determining the coverage enhancement measure to be a coverage enhancement selected according to the highest level of coverage enhancement supported by the base station and further according to a coverage enhancement level needed by the UE and that is selected according to the number of continuous attempts about the UE include instructions for:
determining the coverage enhancement measure to be the coverage enhancement level of the UE in response to the highest coverage enhancement level supported by the base station being higher than or equal to the coverage enhancement level of the UE; and
determining the coverage enhancement measure to be the highest coverage enhancement level supported by the base station in response to the highest coverage enhancement level supported by the base station being lower than the coverage enhancement level of the UE.

8. The base station according to claim 5, wherein the first paging message further comprises a coverage enhancement level of the UE, and wherein instructions for sending the second paging message to the UE are performed according to on a comparison between a first preset condition and a difference between the highest coverage enhancement level supported by the base station and the coverage enhancement level of the UE.

* * * * *